(12) United States Patent
Miyoshi

(10) Patent No.: US 8,667,411 B2
(45) Date of Patent: Mar. 4, 2014

(54) USING STYLE ELEMENTS TO COPY AND PASTE A SELECTED AREA OF A SCREEN DISPLAY

(75) Inventor: Tatsuya Miyoshi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 383 days.

(21) Appl. No.: 12/974,965

(22) Filed: Dec. 21, 2010

(65) Prior Publication Data

US 2011/0173555 A1     Jul. 14, 2011

(30) Foreign Application Priority Data

Jan. 12, 2010   (JP) ................................. 2010-003875

(51) Int. Cl.
*G06F 3/048* (2013.01)
(52) U.S. Cl.
USPC .......................................................... 715/770
(58) Field of Classification Search
USPC .......................................................... 715/770
See application file for complete search history.

(56) References Cited

U.S. PATENT DOCUMENTS

| | | | |
|---|---|---|---|
| 2006/0218492 A1* | 9/2006 | Andrade ........................ | 715/523 |
| 2008/0098317 A1* | 4/2008 | Chen et al. ..................... | 715/764 |
| 2008/0301560 A1* | 12/2008 | Rogers et al. ................. | 715/724 |
| 2009/0044121 A1* | 2/2009 | Berger et al. ................. | 715/724 |

FOREIGN PATENT DOCUMENTS

| | | |
|---|---|---|
| JP | 1091617 | 4/1998 |
| JP | 2004265402 | 9/2004 |
| JP | 2007293801 | 11/2007 |

OTHER PUBLICATIONS

Japanese Patent Application No. 2010-003875: Office Action Mailed Apr. 23, 2013, Partial Translation.
Minako Okura, Chapter 4, Section 14, "Adding Text by Using an Existing Text File", Dreamweaver CS4, Master Book for Windows & Mac, First Edition, Japan, Mainchi Communications, Inc., Apr. 28, 2009, pp. 082-085.

* cited by examiner

*Primary Examiner* — William Bashore
*Assistant Examiner* — Rayeez Chowdhury
(74) *Attorney, Agent, or Firm* — A. Bruce Clay

(57) ABSTRACT

A copy and paste operation allows selection from a copy source display area to be copied from a display screen of a display unit and pasted to a paste destination display area without losing the original appearance and style. A processing unit determines from data generated on the style of a copy source and data on the paste destination style, whether the paste destination style would change the copy source style. If it is determined that the paste destination style would change the copy source style, the copy source style is processed into the paste destination style in order to make the paste destination style consistent with the copy source style. The paste destination display area then displays the copy source display area pasted therein with the copy source style.

15 Claims, 28 Drawing Sheets

CLASSIFICATION OF STYLE SPECIFICATION METHODS

EXEMPLARY CORRESPONDENCE BETWEEN DOCUMENT AND TREE STRUCTURE

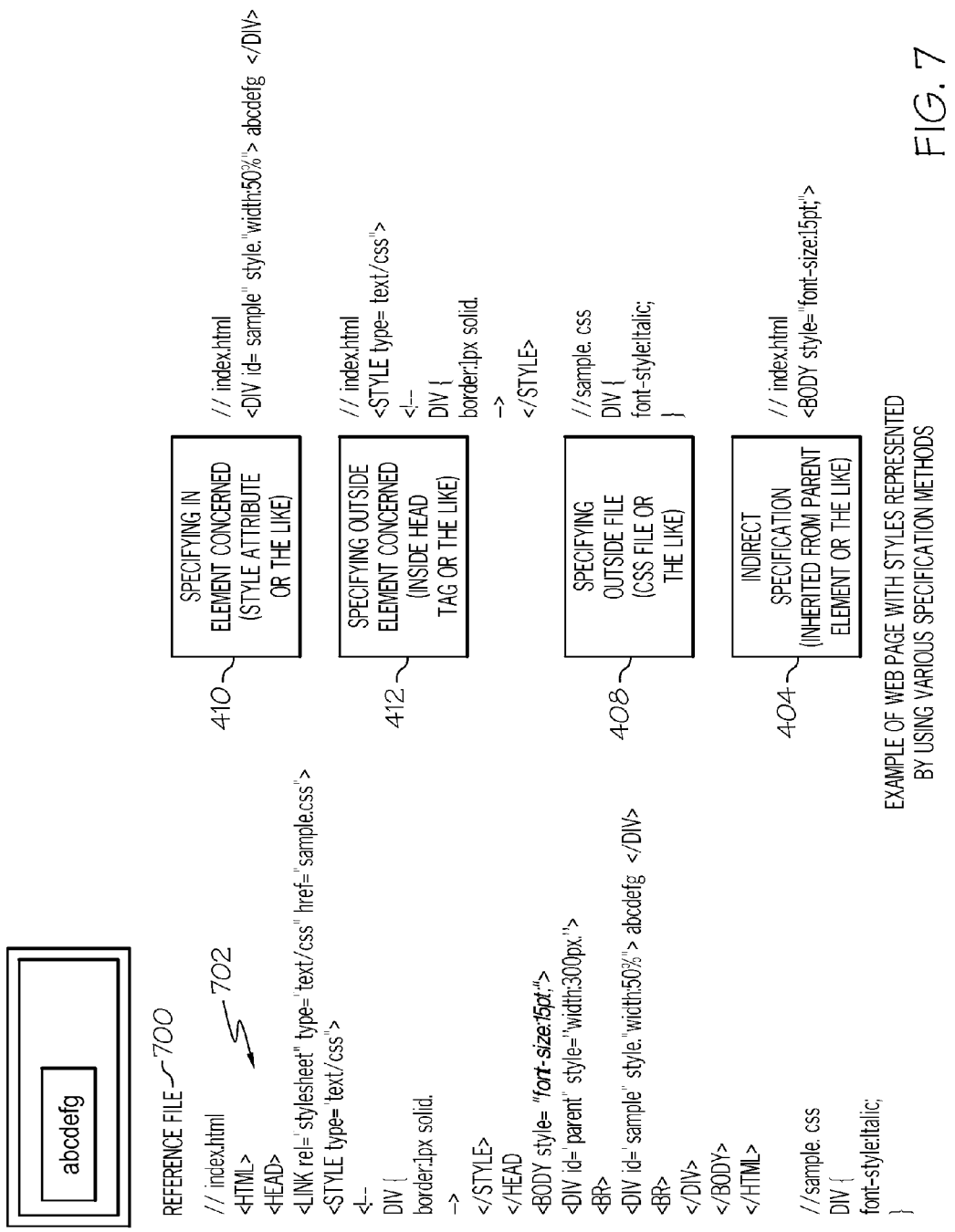

DOCUMENT INFORMATION TABLE 1002

| ELEMENT ID | ELEMENT NAME | START TAG | CONTENT | END TAG | CHILD ELEMENT ID |
|---|---|---|---|---|---|
| 1 | BODY | <BODY> | - | </BODY> | 2,3 |
| 2 | DIV | <DIV> | - | </DIV> | - |
| 3 | DIV | <DIV class="class"> | abcdefg | </DIV> | - |

FIG. 10A

STYLE INFORMATION TABLE 1022

| STYLE ID | SELECTOR ID | SELECTOR | SPECIFIED LOCATION | STYLE VALUE | STYLE PROPERTY |
|---|---|---|---|---|---|
| 1 | 1 | DIV | sample.css | border-color | blue |
| 2 | 1 | DIV | sample.css | border-width | 1px |
| 3 | 2 | .class | sample.css | font-style | Italic |

FIG. 10B

ELEMENT-SPECIFIC STYLE TABLE 1042

| ELEMENT ID | ELEMENT NAME | STYLE PROPERTY | STYLE VALUE | STYLE ID | SPECIFIED SELECTOR | SPECIFIED LOCATION |
|---|---|---|---|---|---|---|
| 1 | BODY | font-size | 15pt | - | - | Index.html |
| 2 | DIV | border-color | blue | 1 | DIV | sample.css |
| 3 | DIV | font-style | Italic | 2 | .class | sample.css |

FIG. 10C

SELECTED ELEMENT STYLE TABLE 1062

| STYLE PROPERTY | STYLE VALUE | STYLE ID | SPECIFIED SELECTOR | SPECIFIED LOCATION |
|---|---|---|---|---|
| font-size | 15pt | - | - | Index.html |
| border-color | blue | 1 | DIV | sample.css |
| font-style | Italic | 2 | .class | sample.css |
| color | black | - | - | - |

FIG. 10D

PASTE CANDIDATE STYLE TABLE 1082

| ELEMENT ID | ELEMENT NAME | STYLE PROPERTY | STYLE VALUE | SPECIFIED SELECTOR | SPECIFIED LOCATION |
|---|---|---|---|---|---|
| 3 | DIV | font-size | 15pt | - | Index.html |
| 3 | DIV | border-color | blue | DIV | sample.css |
| 3 | DIV | font-style | Italic | .class | sample.css |

FIG. 10E

COPY-SOURCE SELECTED ELEMENT STYLE TABLE

| STYLE PROPERTY | STYLE VALUE | STYLE ID | SPECIFIED SELECTOR | SPECIFIED LOCATION |
|---|---|---|---|---|
| width | 50% | - | - | copy.html |
| font-size | 15px | 1 | DIV | .common.css |
| border-width | 1px | 6 | DIV | copy.css |
| font-style | Italic | 2 | .class | copy.css |
| text-indent | 10px | 3 | .class | copy.css |
| border-style | solid | 4 | .class | copy.css |
| border-color | black | 5 | .class | copy.css |

COPY-SOURCE SELECTED ELEMENT STYLE TABLE

| STYLE PROPERTY | STYLE VALUE | STYLE ID | SPECIFIED SELECTOR | SPECIFIED LOCATION |
|---|---|---|---|---|
| width | 50% | - | - | copy.html |
| font-size | 15px | 1 | DIV | .common.css |
| border-width | 1px | 6 | DIV | copy.css |
| font-style | Italic | 2 | .class | copy.css |
| text-indent | 10px | 3 | .class | copy.css |
| border-style | solid | 4 | .class | copy.css |
| border-color | black | 5 | .class | copy.css |
| color | black | 7 | - | copy.css |

COPY-SOURCE SELECTED ELEMENT STYLE TABLE

| STYLE PROPERTY | STYLE VALUE | STYLE ID | SPECIFIED SELECTOR | SPECIFIED LOCATION |
|---|---|---|---|---|
| width | 50% | - | - | copy.html |
| font-size | 15px | 1 | DIV | .common.css |
| border-width | 1px | 6 | DIV | copy.css |
| font-style | Italic | 2 | .class | copy.css |
| text-indent | 10px | 3 | .class | copy.css |
| border-style | solid | 4 | .class | copy.css |
| border-color | black | 5 | .class | copy.css |
| color | black | 7 | - | copy.css |
| background-color | aqua | - | - | - |

COPY-SOURCE SELECTED ELEMENT STYLE TABLE

| STYLE PROPERTY | STYLE VALUE | STYLE ID | SPECIFIED SELECTOR | SPECIFIED LOCATION |
|---|---|---|---|---|
| width | 100px | - | - | copy.html |
| font-size | 15px | 1 | DIV | .common.css |
| border-width | 1px | 6 | DIV | copy.css |
| font-style | Italic | 2 | .class | copy.css |
| text-indent | 10px | 3 | .class | copy.css |
| border-style | solid | 4 | .class | copy.css |
| border-color | black | 5 | .class | copy.css |
| color | black | 7 | - | copy.css |
| background-color | aqua | - | - | - |

1564 — width
1566 — 100px
1562

FIG. 15D

PASTE CANDIDATE STYLE TABLE — 1612

| ELEMENT ID | ELEMENT NAME | STYLE PROPERTY | STYLE VALUE | SPECIFIED SELECTOR | SPECIFIED LOCATION |
|---|---|---|---|---|---|
| A3 | DIV | width | 100px | - | copy.html |
| A3 | DIV | font-size | 15px | DIV | .common.css |
| A3 | DIV | border-width | 1px | DIV | copy.css |
| A3 | DIV | font-style | Italic | .class | copy.css |
| A3 | DIV | text-indent | 10px | .class | copy.css |
| A3 | DIV | border-style | solid | .class | copy.css |
| A3 | DIV | border-color | black | .class | copy.css |
| A3 | DIV | color | black | - | copy.css |
| A3 | DIV | background-color | aqua | - | - |

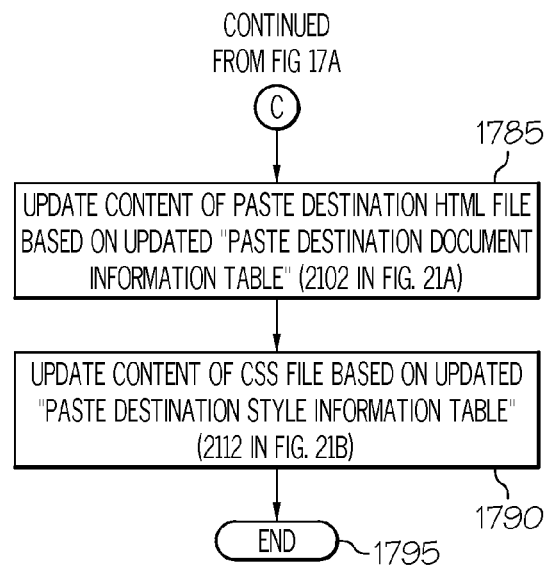

Paste Destination Document Information Table 1802

| ELEMENT ID | ELEMENT NAME | START TAG | CONTENT | END TAG | CHILD ELEMENT ID |
|---|---|---|---|---|---|
| B1 | BODY | <BODY> | - | </BODY> | B2 |
| B2 | P | <P> | hijklmn | </P> | - |

FIG. 18B

Paste Destination Style Information Table 1804

| STYLE ID | SELECTOR ID | SELECTOR | SPECIFIED LOCATION | STYLE PROPERTY | STYLE VALUE |
|---|---|---|---|---|---|
| 1 | 1 | DIV | common.css | font-size | 15px |
| 2 | 2 | * | paste.css | color | gray |
| 3 | 2 | * | paste.css | text-indent | 10px |
| 4 | 3 | DIV | paste.css | border-width | 0px |
| 5 | 4 | DIV | style.css | font-style | normal |

PASTE-DESTINATION ELEMENT-SPECIFIC STYLE TABLE ~1806

| ELEMENT ID | ELEMENT NAME | STYLE PROPERTY | STYLE VALUE | STYLE ID | SELECTOR ID | SPECIFIED SELECTOR | SPECIFIED LOCATION |
|---|---|---|---|---|---|---|---|
| B1 | BODY | color | gray | 2 | 2 | * | paste.css |
| B1 | BODY | text-indent | 10px | 3 | 2 | * | paste.css |
| B2 | P | color | gray | 2 | 2 | * | paste.css |
| B2 | P | text-indent | 10px | 3 | 2 | * | paste.css |

FIG. 18C

PASTE TARGET ELEMENT ~1902

| ELEMENT ID | ELEMENT NAME | ELEMENT DESCRIPTION ORDER IN HTML FILE | START TAG | CONTENT | END TAG | CHILD ELEMENT ID |
|---|---|---|---|---|---|---|
| A3 | DIV | 3 | <DIV class="class"> | abcdefg | </DIV> | - |

FIG. 19A

PASTE CANDIDATE STYLE TABLE ~1912

| ELEMENT ID | ELEMENT NAME | STYLE PROPERTY | STYLE VALUE | SPECIFIED SELECTOR | SPECIFIED LOCATION |
|---|---|---|---|---|---|
| A3 | DIV | width | 100px | - | copy.html |
| A3 | DIV | font-size | 15px | DIV | .common.css |
| A3 | DIV | border-width | 1px | DIV | copy.css |
| A3 | DIV | font-style | Italic | .class | copy.css |
| A3 | DIV | text-indent | 10px | .class | copy.css |
| A3 | DIV | border-style | solid | .class | copy.css |
| A3 | DIV | border-color | black | .class | copy.css |
| A3 | DIV | color | black | - | copy.css |
| A3 | DIV | background-color | aqua | - | - |

FIG. 19B

PASTE DESTINATION DOCUMENT INFORMATION TABLE ⟵ 2002

| ELEMENT ID | ELEMENT NAME | ELEMENT DESCRIPTION ORDER IN HTML FILE | START TAG | CONTENT | END TAG | CHILD ELEMENT ID |
|---|---|---|---|---|---|---|
| B1 | BODY | 1 | <BODY> | - | </BODY> | B2,A3 |
| B2 | P | 2 | <P> | hijklmn | </P> | - |
| A3 | DIV | 3 | <DIV class='class'> | abcdefg | </DIV> | - |

FIG. 20A

PASTE ELEMENT RECORD 2018    ⟵ 2012

| ELEMENT ID | ELEMENT NAME | ELEMENT DESCRIPTION ORDER IN HTML FILE | START TAG | CONTENT | END TAG | CHILD ELEMENT ID |
|---|---|---|---|---|---|---|
| A3 | DIV | 3 | <DIV class='class'> | abcdefg | </DIV> | - |

2014 → ELEMENT ID
2016 → ELEMENT NAME
2020 ↑

FIG. 20B

PASTE-DESTINATION SELECTED ELEMENT STYLE TABLE ⟵ 2022

| STYLE PROPERTY | STYLE VALUE | STYLE ID | SPECIFIED SELECTOR | SPECIFIED LOCATION |
|---|---|---|---|---|
| font-size | 15px | 1 | DIV | common.css |
| color | gray | 2 | * | paste.css |
| text-indent | 10px | 3 | * | paste.css |
| border-width | 0px | 4 | DIV | paste.css |
| font-style | normal | 5 | DIV | style.css |

FIG. 20C

PASTE DESTINATION DOCUMENT INFORMATION TABLE　　　　2102

| ELEMENT ID | ELEMENT NAME | ELEMENT DESCRIPTION ORDER IN HTML FILE | START TAG | CONTENT | END TAG | CHILD ELEMENT ID |
|---|---|---|---|---|---|---|
| B1 | BODY | 1 | <BODY> | - | </BODY> | B2,A3 |
| B2 | P | 2 | <P> | hijklmn | </P> | - |
| A3 | DIV | 3 | <DIV class="class" id="A001"> | abcdefg | </DIV> | - |

FIG. 21A

PASTE DESTINATION STYLE INFORMATION TABLE　　　2112

| STYLE ID | SELECTOR ID | SELECTOR | SPECIFIED LOCATION | STYLE VALUE | STYLE PROPERTY |
|---|---|---|---|---|---|
| 1 | 1 | DIV | common.css | font-size | 15px |
| 2 | 2 | DIV | paste.css | color | gray |
| 3 | 2 | * | paste.css | text-indent | 10px |
| 4 | 3 | * | paste.css | border-width | 1px |
| 5 | 4 | DIV | style.css | font-style | normal |
| 6 | 5 | DIV | style.css | border-style | solid |
| 7 | 5 | .class | style.css | border-color | black |
| 8 | 6 | .class | style.css | width | 100px |
| 9 | 6 | #A001 | style.css | font-style | italic |
| 10 | 6 | #A001 | style.css | text-indent | 10px |
| 11 | 6 | #A001 | style.css | border-style | solid |
| 12 | 6 | #A001 | style.css | border-color | black |
| 13 | 6 | #A001 | style.css | color | black |
| 14 | 6 | #A001 | style.css | background-color | agua |

| | |
|---|---|
| SELECT RECORD HAVING SAME PROPERTY AS "SELECTED STYLE" FROM "PASTE-DESTINATION SELECTED ELEMENT STYLE TABLE" | 2205 |
| CHANGE VALUE OF SELECTED STYLE TO STYLE VALUE IN "PASTE CANDIDATE STYLE TABLE" | 2210 |
| UPDATE "PASTE DESTINATION STYLE INFORMATION TABLE" BASED ON CHANGE IN "PASTE-DESTINATION SELECTED ELEMENT STYLE TABLE" (UPDATE STYLE VALUE OF RECORD HAVING SAME STYLE ID) | 2215 |

FIG. 22

WHEN SELECTED STYLE IS AS FOLLOW:

| ELEMENT ID | ELEMENT NAME | STYLE PROPERTY | STYLE VALUE | SPECIFIED SELECTOR | SPECIFIED LOCATION |
|---|---|---|---|---|---|
| A3 | DIV | border-width | 1px | DIV | copy.css |

RECORD HAVING SAME PROPERTY IN "PASTE-DESTINATION SELECTED ELEMENT STYLE TABLE"

| STYLE PROPERTY | STYLE VALUE | STYLE ID | SPECIFIED SELECTOR | SPECIFIED LOCATION |
|---|---|---|---|---|
| border-width | 0px | 4 | DIV | paste.css |

PASTE DESTINATION STYLE INFORMATION TABLE

| STYLE ID | SELECTOR ID | SELECTOR | SPECIFIED LOCATION | STYLE VALUE | STYLE PROPERTY |
|---|---|---|---|---|---|
| 4 | 3 | DIV | paste.css | border-width | 1px |

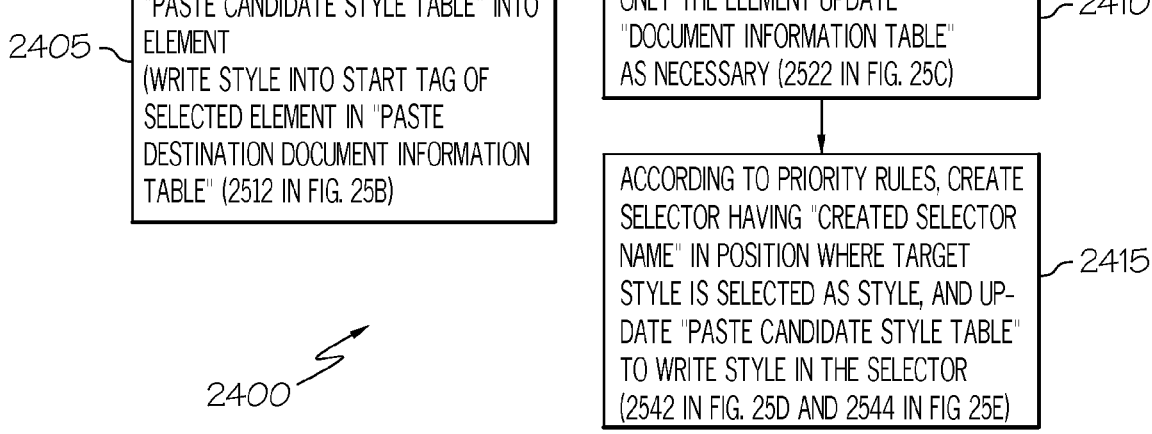

FIG. 24

WHEN SELECTED STYLE IS AS FOLLOWS:

| ELEMENT ID | ELEMENT NAME | STYLE PROPERTY | STYLE VALUE | SPECIFIED SELECTOR | SPECIFIED LOCATION |
|---|---|---|---|---|---|
| A3 | DIV | text-index | 10px | .class | copy.css |

FIG. 25A

PASTE DESTINATION DOCUMENT INFORMATION TABLE

| ELEMENT ID | ELEMENT NAME | ELEMENT DESCRIPTION ORDER IN HTML FILE | START TAG | CONTENT | END TAG | CHILD ELEMENT ID |
|---|---|---|---|---|---|---|
| B1 | BODY | 1 | <BODY> | - | </BODY> | B2,A3 |
| B2 | P | 2 | <P> | hijklmn | </P> | - |
| A3 | DIV | 3 | <DIV class="class" style="text-indent:10px;"> | abcdefg | </DIV> | - |

FIG. 25B

PASTE DESTINATION DOCUMENT INFORMATION TABLE

| ELEMENT ID | ELEMENT NAME | ELEMENT DESCRIPTION ORDER IN HTML FILE | START TAG | CONTENT | END TAG | CHILD ELEMENT ID |
|---|---|---|---|---|---|---|
| B1 | BODY | 1 | <BODY> | - | </BODY> | B2,A3 |
| B2 | P | 2 | <P> | hijklmn | </P> | - |
| A3 | DIV | 3 | <DIV class="class" style= id="A001"> | abcdefg | </DIV> | - |

FIG. 25C

RECORD HAVING SAME PROPERTY IN "PASTE-DESTINATION SELECTED ELEMENT STYLE TABLE"

| STYLE PROPERTY | STYLE VALUE | STYLE ID | SPECIFIED SELECTOR | SPECIFIED LOCATION |
|---|---|---|---|---|
| text-indent | 10px | 3 | * | paste.css |

ADDED RECORD IN "PASTE DESTINATION STYLE INFORMATION TABLE"

| STYLE ID | SELECTOR ID | SELECTOR | SPECIFIED LOCATION | STYLE PROPERTY | STYLE VALUE |
|---|---|---|---|---|---|
| 10 | 6 | #A001 | style.css | text.indent | 10px |

WRITE SAME SELECTOR AS THAT IN "PASTE CANDIDATE STYLE TABLE" IN ANY LOCATION, AND WRITE SAME STYLE THEREIN (2702 AND 2712 IN FIG. 27)  — 2605

WHEN SELECTED STYLE IS AS FOLLOW:

| ELEMENT ID | ELEMENT NAME | STYLE PROPERTY | STYLE VALUE | SPECIFIED SELECTOR | SPECIFIED LOCATION |
|---|---|---|---|---|---|
| A3 | DIV | border-style | solid | .class | style.css |

ADDED RECORD IN "PASTE DESTINATION STYLE INFORMATION TABLE"

| STYLE ID | SELECTOR ID | SELECTOR | SPECIFIED LOCATION | STYLE PROPERTY | STYLE VALUE |
|---|---|---|---|---|---|
| 6 | 5 | .class | style.css | border-style | solid |

FIG. 27B

USING STYLE ELEMENTS TO COPY AND PASTE A SELECTED AREA OF A SCREEN DISPLAY

CROSS-REFERENCE TO RELATED APPLICATIONS

The present application claims a priority filing date of Jan. 12, 2010 from Japanese Patent Application No. 2010-3875, which is incorporated herein in its entirety by reference.

BACKGROUND

The present invention relates to information processing for a screen display, and particularly to copying and pasting a selected display area of a screen display using elements of the display which are specified by style (also referred to as "style elements").

The use of web pages has grown, as network technology, such as the Internet, has spread. A web page comprises text data, layout information, especially style elements, written in HTML (HyperText Markup Language) or XHTML (eXtensible HyperText Markup Language), and with images, sound, video, and the like to be embedded, therein. These pieces of data that make up the web page, i.e. the content, are provided as a document file. For example, the document file of a web page is created using application software having a web page creation/editing function in a local environment of a client terminal, such as a personal computer.

The display style of a web page has become more complicated. This is due to the need for an SEO (Search Engine Optimization) measure (a measure for boosting the ranking of the web page in search engine result pages), the separation of the document structure and styles to allow for easier maintenance, and a page having a higher degree of freedom to make it easier for a user to customize the layout.

BRIEF SUMMARY

According to one aspect of the present invention, a copy source display area to be copied is selected from a display screen of a display unit, wherein the copy source display area comprises elements specified by style. A processing unit generates data on a paste target element, specified by style, from stored data on display information for the copy source display area. Data is generated on a copy source style related to the paste target element from the data on display information for the copy source display area and the data on the paste target element. An input device is used to indicate on the display screen of the display unit, a paste destination display area into which the copy source display area is to be pasted. Data is generated on a paste destination style associated with the paste target element from data on display information for the paste destination display area stored in the storage unit and the data on the paste target element. Data on the copy source style and the data on the paste destination style is generated to determine whether the paste destination style would change the copy source style. When it is determined that the paste destination style would change the copy source style, the copy source style is processed into the paste destination style in order to make the paste destination style consistent with the copy source style, and data is generated on the paste destination style with the copy source style therein. The paste destination display area is displayed with the copy source display area pasted therein, on the display screen using the data generated on the paste destination style with the copy source style therein.

According to another aspect of the present invention, a computer program product copies and pastes. The computer program product comprises a computer readable storage medium having computer readable program code embodied therewith. Computer readable program code is configured to select a copy source display area to be copied from a display screen of a display unit, wherein the copy source display area comprises elements which are specified by style. The computer readable program code is configured to generate data on a paste target element specified by style from stored data on display information for the copy source display area. The computer readable program code is configured to generate data on a copy source style related to the paste target element from the data on display information for the copy source display area and the data on the paste target element. The computer readable program code is configured to indicate, using the input device on the display screen of the display unit, a paste destination display area into which the copy source display area is to be pasted. The computer readable program code is configured to generate data on a paste destination style associated with the paste target element from data on display information for the paste destination display area stored in the storage unit and the data on the paste target element. The computer readable program code is configured to determine from the generated data on the copy source style and the data on the paste destination style, whether the paste destination style would change the copy source style. The computer readable program code is configured to, when it is determined that the paste destination style would change the copy source style, process the copy source style into the paste destination style in order to make the paste destination style consistent with the copy source style, and generate data on the paste destination style with the copy source style therein. The computer readable program code is configured to display the paste destination display area, with the copy source display area pasted therein, on the display screen using the data generated on the paste destination style with the copy source style therein.

According to another aspect of the present invention, a copy and paste system comprises a processor and memory connected to the processor. The memory is encoded with instructions and the instructions when executed comprise instructions for selecting, using an input device, a copy source display area to be copied from a display screen of a display unit, wherein the copy source display area comprises elements which are specified by style. The instructions generate, using a processing unit, data on a paste target element specified by style from stored data on display information for the copy source display area. The instructions generate, using the processing unit, data on a copy source style related to the paste target element from the data on display information for the copy source display area and the data on the paste target element. The instructions indicate, using the input device on the display screen of the display unit, a paste destination display area into which the copy source display area is to be pasted. The instructions generate, using the processing unit, data on a paste destination style associated with the paste target element from data on display information for the paste destination display area stored in the storage unit and the data on the paste target element. The instructions determine, with the processing unit, from the generated data on the copy source style and the data on the paste destination style, whether the paste destination style would change the copy source style. The instructions, when it is determined that the paste destination style would change the copy source style, process the copy source style into the paste destination style in order to make the paste destination style consistent with the copy source style, and generate data on the paste destination style with the copy source style therein. The instructions display the paste destination display area, with the copy source display area pasted therein, on the display screen using the data generated on the paste destination style with the copy source style therein.

BRIEF DESCRIPTION OF THE SEVERAL VIEWS OF THE DRAWINGS

FIG. 7 is a diagram showing an HTML file of a web page;

FIGS. 10A-E are a diagram showing tables generated and used for rendering;

FIGS. 15A-D are a diagram showing tables generated and used in the example of FIG. 12;

FIG. 16 is a diagram showing a table generated and used in the example of FIG. 12;

FIGS. 17A-B are a flowchart showing one example of paste processing in the embodiment of FIG. 11;

FIGS. 18A-C are a diagram showing tables generated and used in the example of FIG. 17;

FIGS. 19A-B are a diagram showing tables generated and used in the example of FIG. 17;

FIGS. 20A-C are a diagram showing tables generated and used in the example of FIG. 17;

FIGS. 21A-B are a diagram showing tables generated and used in the example of FIG. 17;

FIG. 22 is a flowchart showing processing of "method a" in the example of FIG. 17;

FIGS. 23A-C are a diagram showing tables related to the processing in FIG. 22;

FIG. 24 is a flowchart showing processing of "method b" in the example of FIG. 17;

FIGS. 25A-E are a diagram showing tables related to the processing in FIG. 24;

FIG. 26 is a flowchart showing processing of "method c" in the example of FIG. 17;

FIGS. 27A-B are a diagram showing tables related to the processing in FIG. 26;

DETAILED DESCRIPTION

Figure 1:
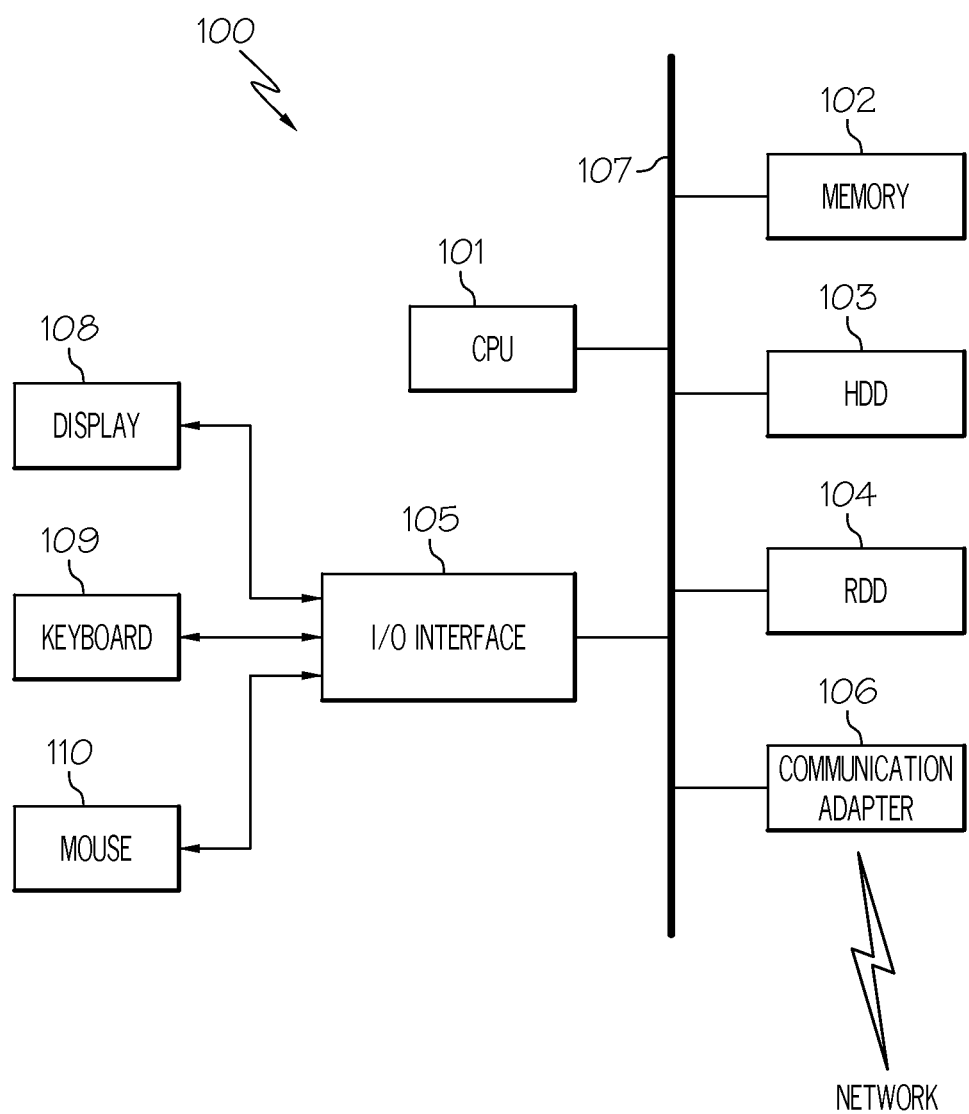
FIG. 1 is a schematic block diagram showing a hardware configuration of a computer 100 to which copy and paste method, system and program according to one preferred embodiment of the present invention is applied.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 is a schematic block diagram showing a hardware configuration of a computer 100 to which the copy and paste method for one embodiment of the present invention can be applied. As shown in FIG. 1, the computer 100 includes a CPU 101 as a processing unit, a memory 102, a hard disk drive (HDD) 103 and a removable disk drive (RDD) 104 as storage units, which allows a recording medium such as a flexible disk, a CD-ROM, a CD-R or a DVD-ROM to run, an I/O interface 105 as an I/O control unit and a communication adapter 106 as a communication control unit for connecting the computer to a network such as the Internet. The computer 100 has a configuration in which these components are connected through a bus 107. The computer 100 is connectable to a display unit 108, a keyboard 109 and a mouse 110 as input devices through the I/O interface 105, and is connected to the network through the communication adapter 106. Each function of the computer 100 is implemented by reading various kinds of software installed from the HDD 103 to the memory 102 upon booting up the computer or upon program execution and having the CPU 101 process them sequentially.

Figure 2:
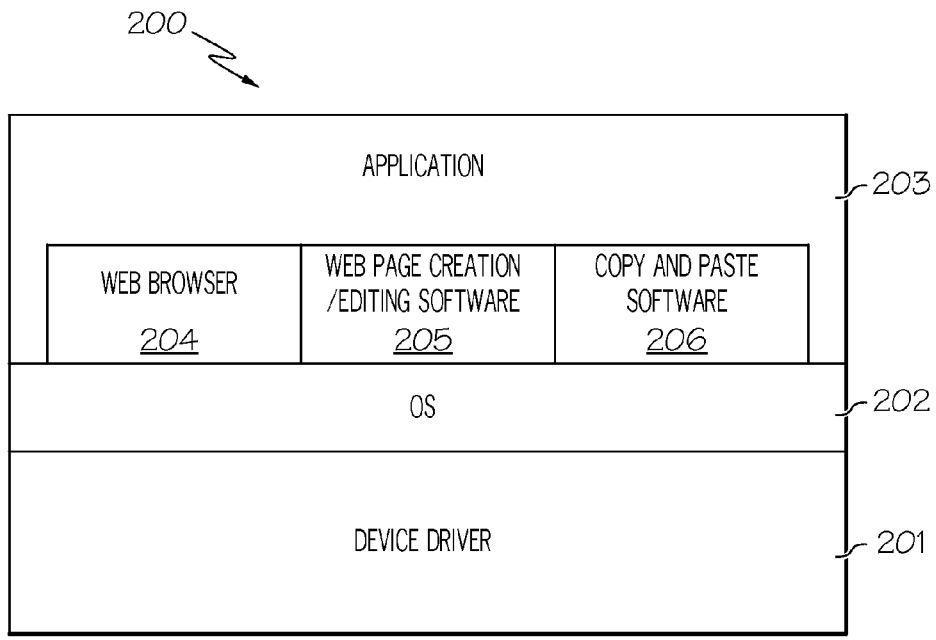
FIG. 2 is a schematic diagram showing a software configuration 200 of the computer 100.

FIG. 2 is a schematic diagram showing a software configuration 200 of the computer 100. As shown in FIG. 2, the computer 100 includes a device driver 201, an operating system (OS) 202 and application software 203. The application software 203 includes a web browser 204 for web page browsing during connection to the Internet and a web page creation/editing software 205 for creating/editing web pages.

According to the present invention, in addition to the web page creation/editing software 205, copy and paste software 206 is provided to implement the function of copying and pasting a selected display area of a screen display using style elements without changing any style. The copy and paste software 206 may be incorporated into the web page creation/editing software 205 as a part thereof. The copy and paste software 206 is read from the HDD 103 to the memory 102, and the CPU 101 executes a processing procedure, as will be subsequently described in greater detail, hereafter.

In order to help understand the copy and paste operations according to the present invention, the style of a web page will be described briefly. The web page consists of a document written in a markup language, such as HTML or XHTML, and a style sheet. The document is constructed in units of "elements," and a "style" can be specified for each element.

Figure 3:
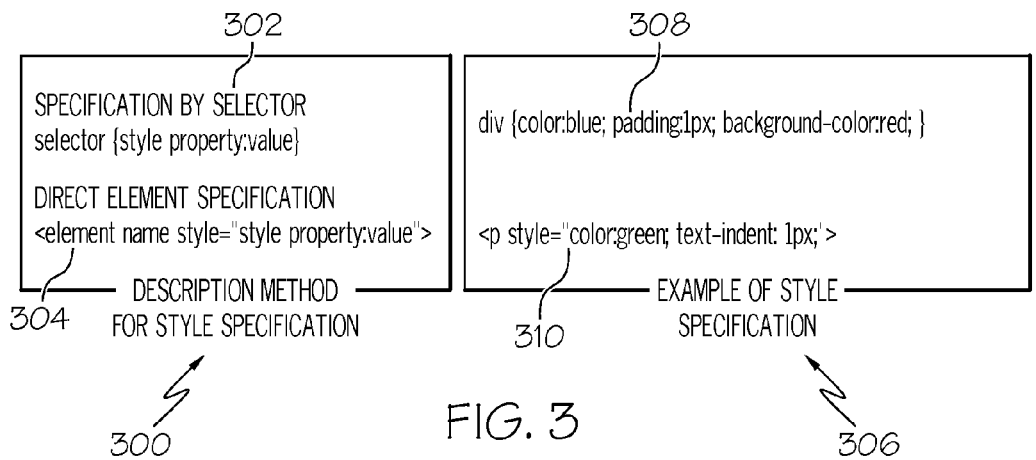
FIG. 3 is a diagram showing description methods for style specification.

There are two methods of describing style specification 300, as shown in FIG. 3. A description method for specifying a style by means of a selector 302, and a description method for specifying a style directly for an element 304 are shown. In this specification, one property and one value are collectively called "style" regardless of the description method for specifying the style. In the specific examples shown at reference numeral 306, the number of styles described at 308 (corresponding to 302) is three, i.e., "color:blue," "padding: 1px," and "background-color:red." Additionally, the number of styles described at 310 (corresponding to 304), is two, i.e., "color:green" and "text-indent:1px."

Figure 4:
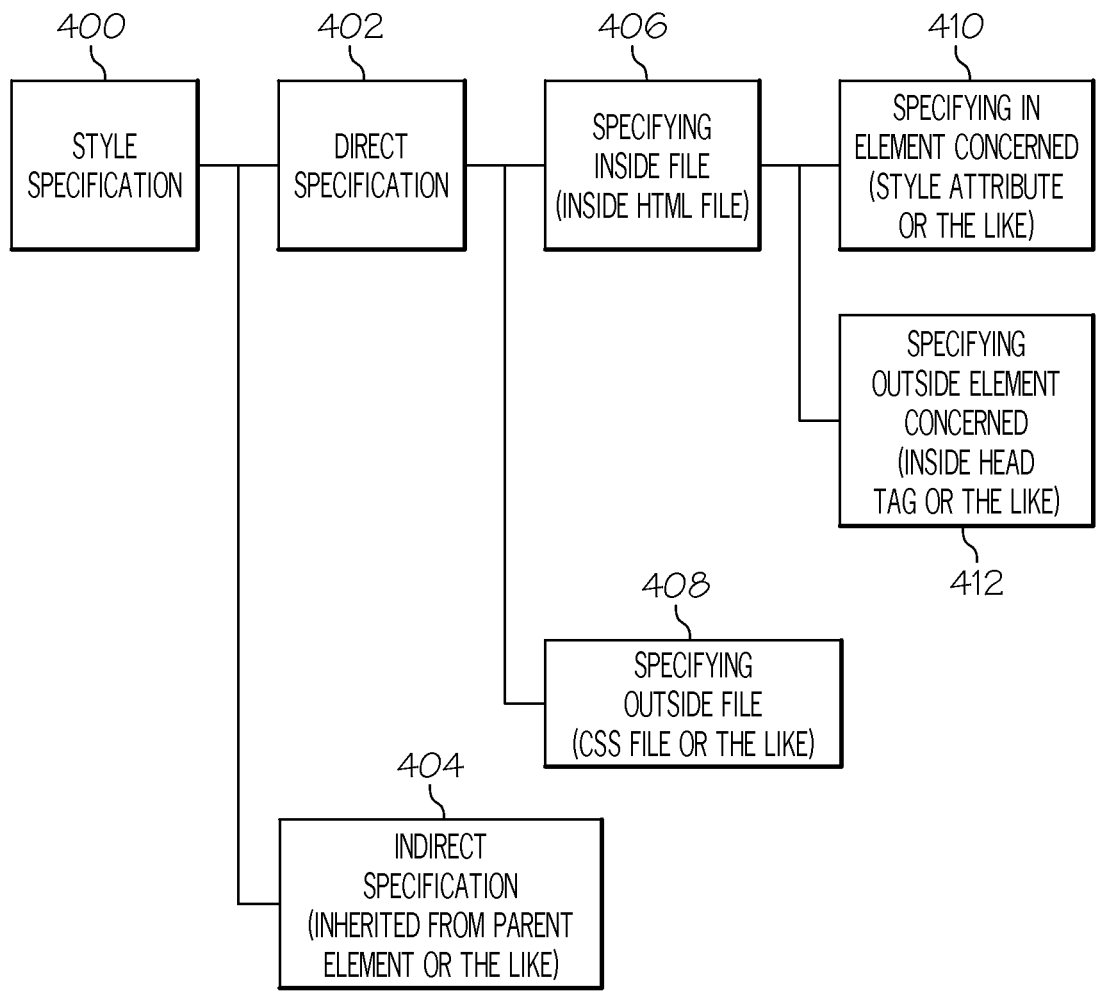
FIG. 4 is a diagram showing the classification of style specification methods.

FIG. 4 shows style specification methods 400 classified into major categories. First, the methods are classified into a direct specification 402 and an indirect specification 404 (inherited from a parent element or the like). Then, the direct specification 402 is divided into specifying inside a file 406 (inside an HTML file) and specifying outside the file 408 (such as a CSS (Cascading Style sheets) file). Further, specifying inside a file 406 is divided into specifying in an element concerned 410 (style attribute or the like, e.g., inline style) and specifying outside the element concerned 412 (inside the head tag or the like). After all the style specification methods 400 are classified into specifying in an element concerned 410, specifying outside the element concerned 412, specifying outside the file 408, and indirect specification 404, these style specification methods are used according to priority rules to determine styles. The priority rules are optional, and frequently, the order of priority is 410, 412, 408, and 404. In the case of same specification methods, the last style used has the higher priority. As for the methods of describing style specification in FIG. 4 relative to those of FIG. 3:

specifying a style directly for an element 304 equates to specifying in an element concerned 410 (style attribute or the like); and specifying a style by means of a selector 302 equates to specifying outside the element concerned 412, specifying outside the file 408, and an indirect specification 404.

Figure 5A:
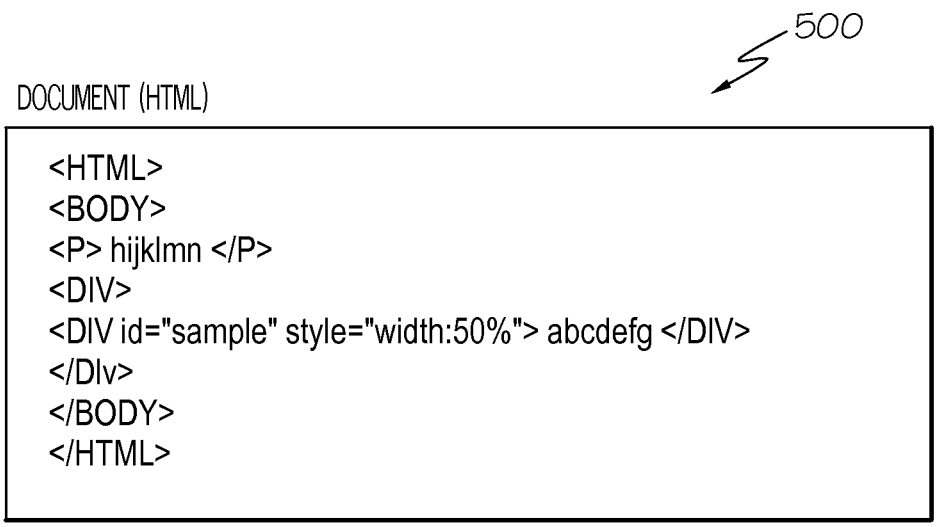
FIGS. 5A-B contain diagrams showing an example of a web page document.
Figure 5B:
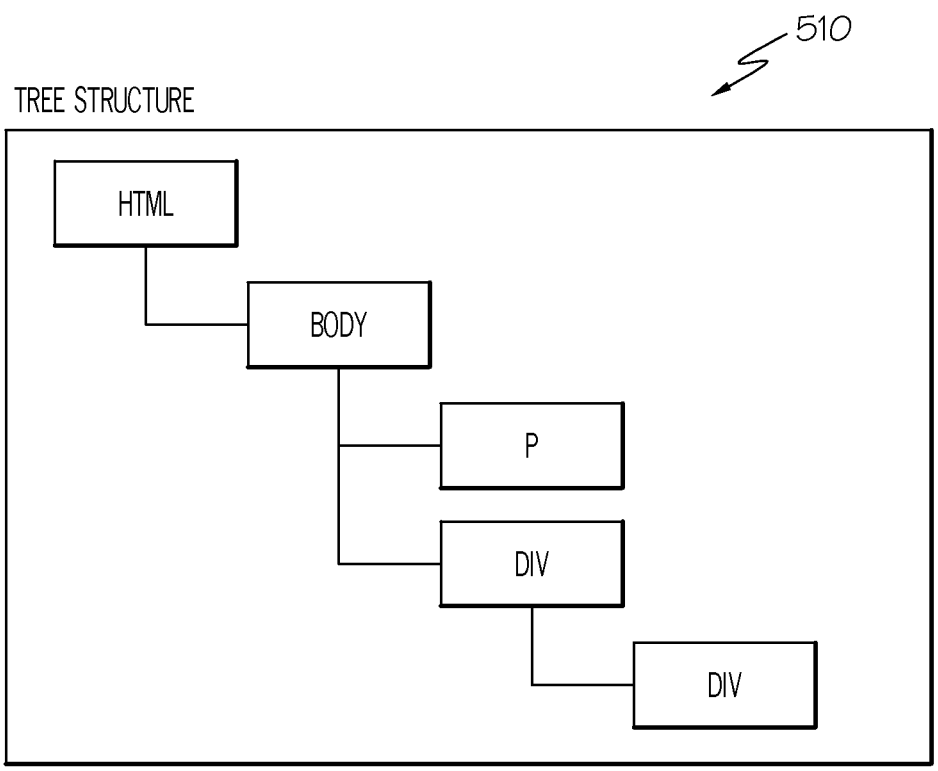

FIGS. 5A-B show an example of a web page document 500 which is an HTML file of a document and each of the elements, thereof, are represented in a tree structure 510. Styles are inherited from parent elements or the like under any rule. The document is rendered as a web page based on the styles as determined by a web browser or a web page editor.

FIGS. 6A-D show an example in which a group of elements in a rendered web page is selected and pasted elsewhere, wherein the pasted result is different from the original. For example, when a rectangle 600 (copy source display area) displayed at a copy source 602 inside a web page 603 on a display screen 605 is selected and pasted into a paste destination 604 of a different web page 607, rendering as per the original copy source 602 is lost when using a conventional paste method as shown at 606. This is due to the complexity of the style specification method and prioritization rules or an indirect impact thereof. As shown in FIG. 4, the specification methods were classified into four major categories 404, 408, 410, and 412. Among these specification methods, the conventional copy and paste 606 corresponds only to specifying in an element concerned 410. As shown at ideal paste 608, it is desired to provide a display without losing the rendering as shown in the original copy source 602.

Figure 6A:
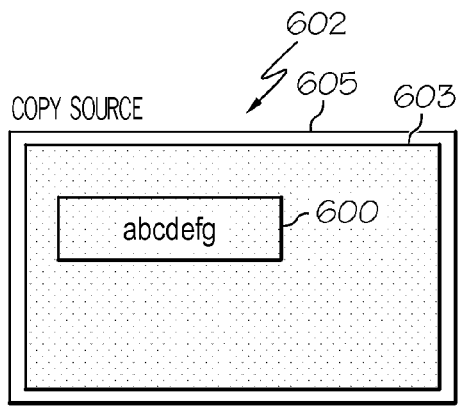
FIGS. 6A-D are a diagram showing rendering screen displays upon pasting into a different web page.
Figure 6B:
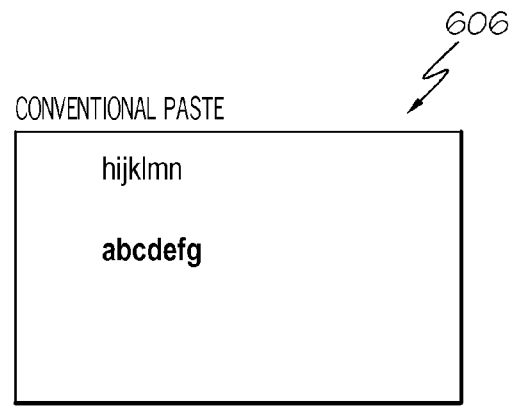
Figure 6C:
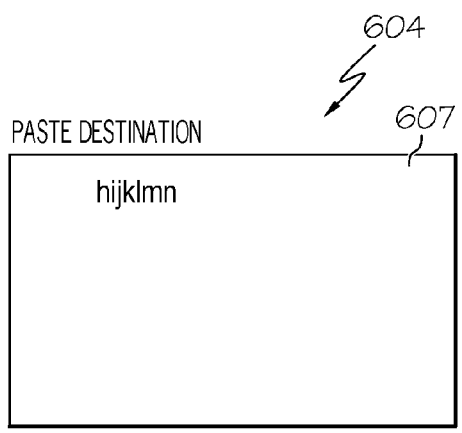
Figure 6D:
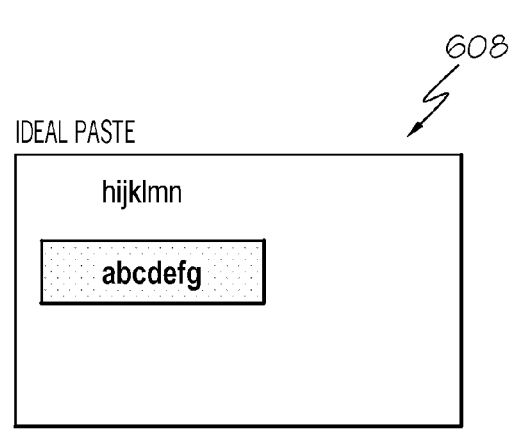

FIG. 7 shows, as a reference file 700, an HTML file 702 for the web page 603 at copy source 602 from FIG. 6A. Even in such a simple rendering, four kinds of styles are provided at respective positions specified by the four specification methods. On the right side of FIG. 7, portions corresponding to the four kinds of styles (404, 408, 410, and 412 of FIG. 4) are extracted and shown. The CSS rules are defined by the World Wide Web Consortium (W3C) that has developed the standardization of HTML. According to the rules, it can be determined which element affects indirectly (see CSS specifications (W3C recommendation)).

Thus, the style specification methods are complicated, and the style specification methods are required to correspond to these previously described four kinds of styles (404, 408, 410, and 412 of FIG. 4). However, even if all the specification methods are just copied and pasted without leaving out any of them, the following problems should be considered:

The specification methods 404, 408, and 412 could change the paste destination styles of elements other than that of a paste target element.

The style could change due to a difference in rendering position between the copy source and the paste destination. For example, this could result from the influence of a parent element specified by a Document Type Definition (DTD), or the like, or a difference in a style default value defined for each web page. There is also a need to consider indirect impacts as well as the expressed rules.

Figure 8A:
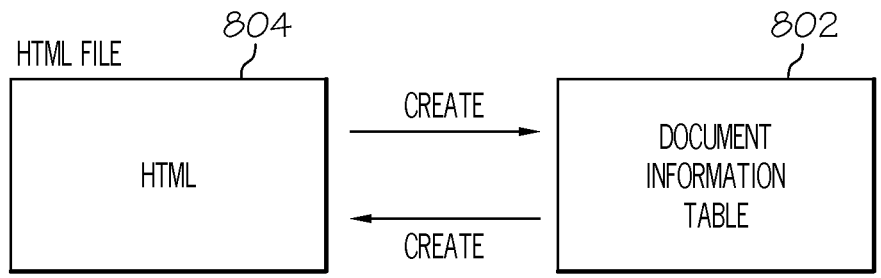
FIGS. 8A-C are a diagram showing a file for rendering and information tables.
Figure 8B:
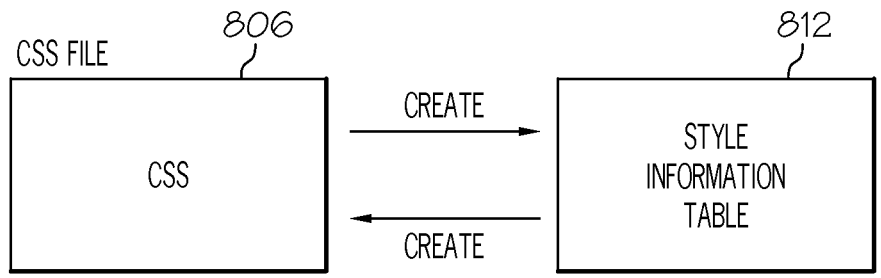
Figure 8C:
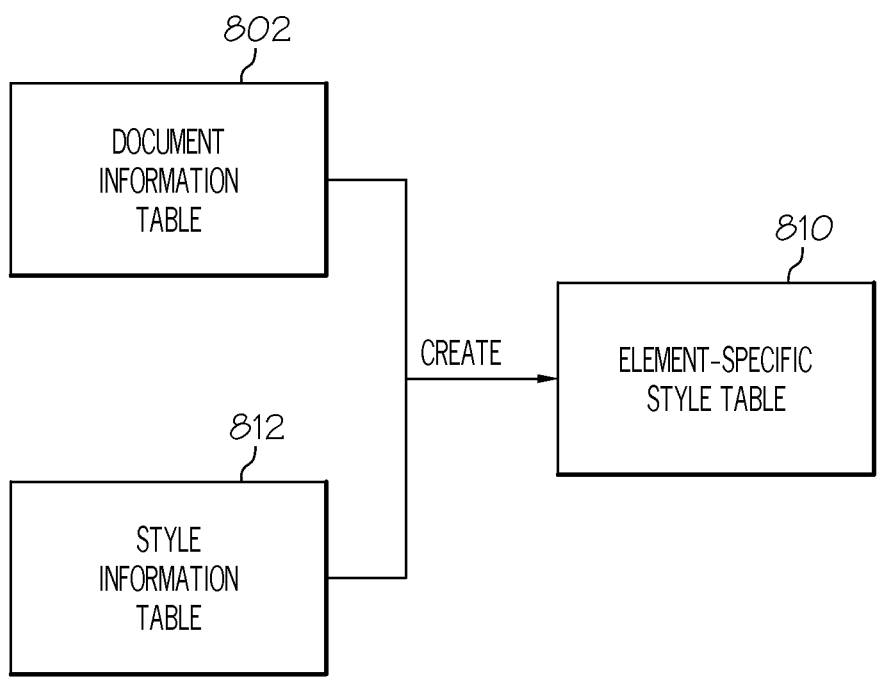

As shown in FIGS. 8A-C, a web page editor has a document information table 802 put in a one-to-one correspondence with an HTML file 804 of a document. The web page editor can create the document information table 802 from the HTML file 804 of the document, or conversely, it can create the HTML file 804 of the document from the document information table 802. When changing the content of a document, the web page editor creates a document information table 802 upon reading the HTML file 804 of the document, changes the content of the document information table 802 as desired, and changes the HTML file 804 of the document based on the document information table 802 as changed. Similarly, as for a CSS file 806 for styles, the web page editor has a style information table 812 put in a one-to-one correspondence with the CSS file 806. The style information table 812 manages all the styles specified by the selector as shown at 302 in FIG. 3. When a style is specified by the selector in the HTML file 804, the file put in a one-to-one correspondence with the style information table 812 is the HTML file 804, rather than the CSS file 806.

Further, as shown in FIGS. 8A-C, an "element-specific style table" 810 for associating an HTML file 804 with a CSS file 806 is created from a document information table 802 and a style information table 812. This is a CSS common rule, and is determined based on whether an element name, element ID or class name of an element is included in the selector, or the like. The details of CSS rules are defined by the W3C that has developed the standardization of HTML. According to the rules, it can be determined which element affects indirectly (see CSS specifications (W3C recommendation)).

Figure 9A:
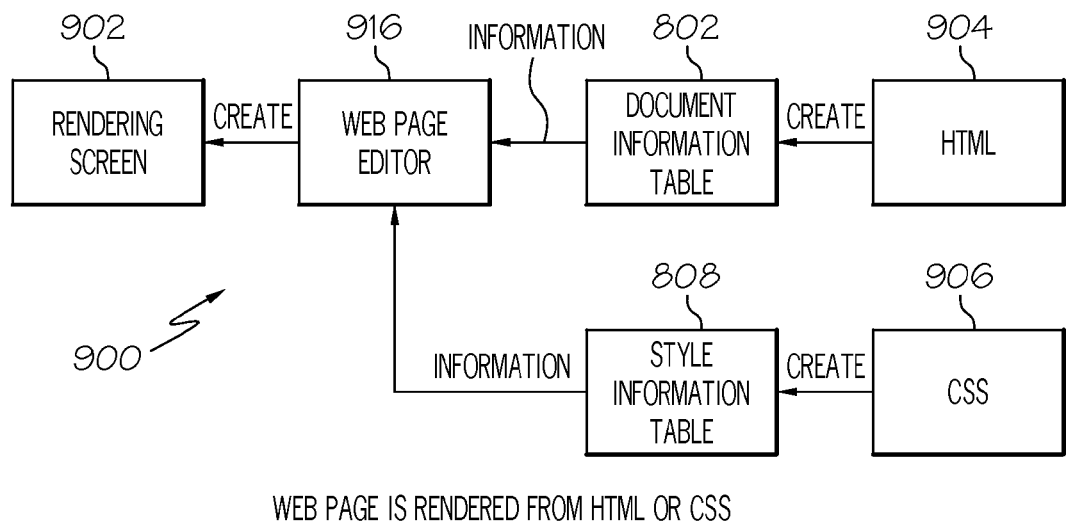
FIGS. 9A-B are a diagram showing the relationship between a rendering screen and an HTML file and a CSS file.
Figure 9B:
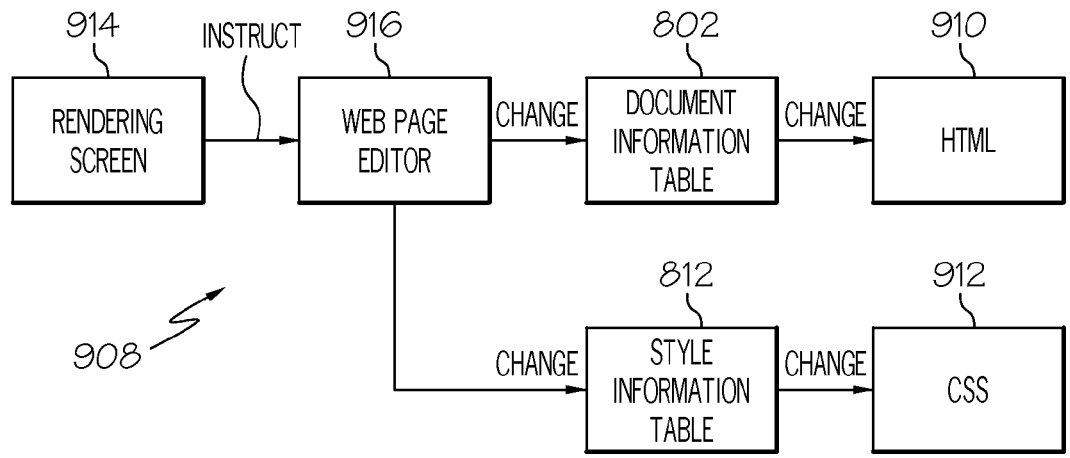

FIGS. 9A-B show the relationships between a rendering screen 902, an HTML file 904, and a CSS file 906. As generally identified by reference numeral 900, there is shown a relationship when a web page is rendered by a web page editor 916 from the HTML file 904 and the document information table 802 or the CSS file 906 and the style information table 808 (see 812 in FIGS. 8B and 8C). As generally identified by reference numeral 908, there is shown a relationship when a user gives an instruction of a change in an HTML file 910 or a CSS file 912 from a rendering screen 914. When a web page is rendered on the screen 914 by a rendering engine (not shown) with a click of a mouse, or the like, the web page editor 916 can know a corresponding position of the HTML file 910 from position information. Then, the web page editor 916 can change or make an addition to the content of the HTML file 910 under an instruction from the rendering screen 914. The web page editor 916 stores each element of the HTML file 910 and its position on the rendering screen 914.

FIGS. 10A-E shows an example of a document information table 1002, a style information table 1022 and an element-specific style table 1042. These tables are related to the reference file 700 shown in FIG. 7. The document information table 1002 includes, as its entries, information on an element ID 1004, an element name 1006, a start tag 1008, content 1010, an end tag 1012 and a child element ID 1014. The style information table 1022 includes, as its entries, information on a style ID 1024, a selector ID 1026, a selector 1028, a specified location 1030, a style value 1032 and a style property 1034. The element-specific style table 1042 includes, as its entries, information on an element ID 1044, an element name 1046, a style property 1048, a style value 1050, a style ID 1052, a specified selector 1054 and a specified location 1056. In addition to tables 1002, 1022, 1042, a selected element style table 1062 and a paste candidate style table 1082 generated from these tables (1002, 1022, and 1042) are also shown. The selected element style table 1062 includes, as its entries, information on style property 1064, a style value 1066, a style ID 1068, a specified selector 1070, and a specified location 1072. The paste candidate style table 1082 includes, as its entries, information on an element ID 1084, an element name 1086, a style property 1088, a style value 1090, a specified selector 1092 and a specified location 1094. The selected element style table 1062 and the paste candidate style table 1082 will be subsequently discussed.

Figure 11:
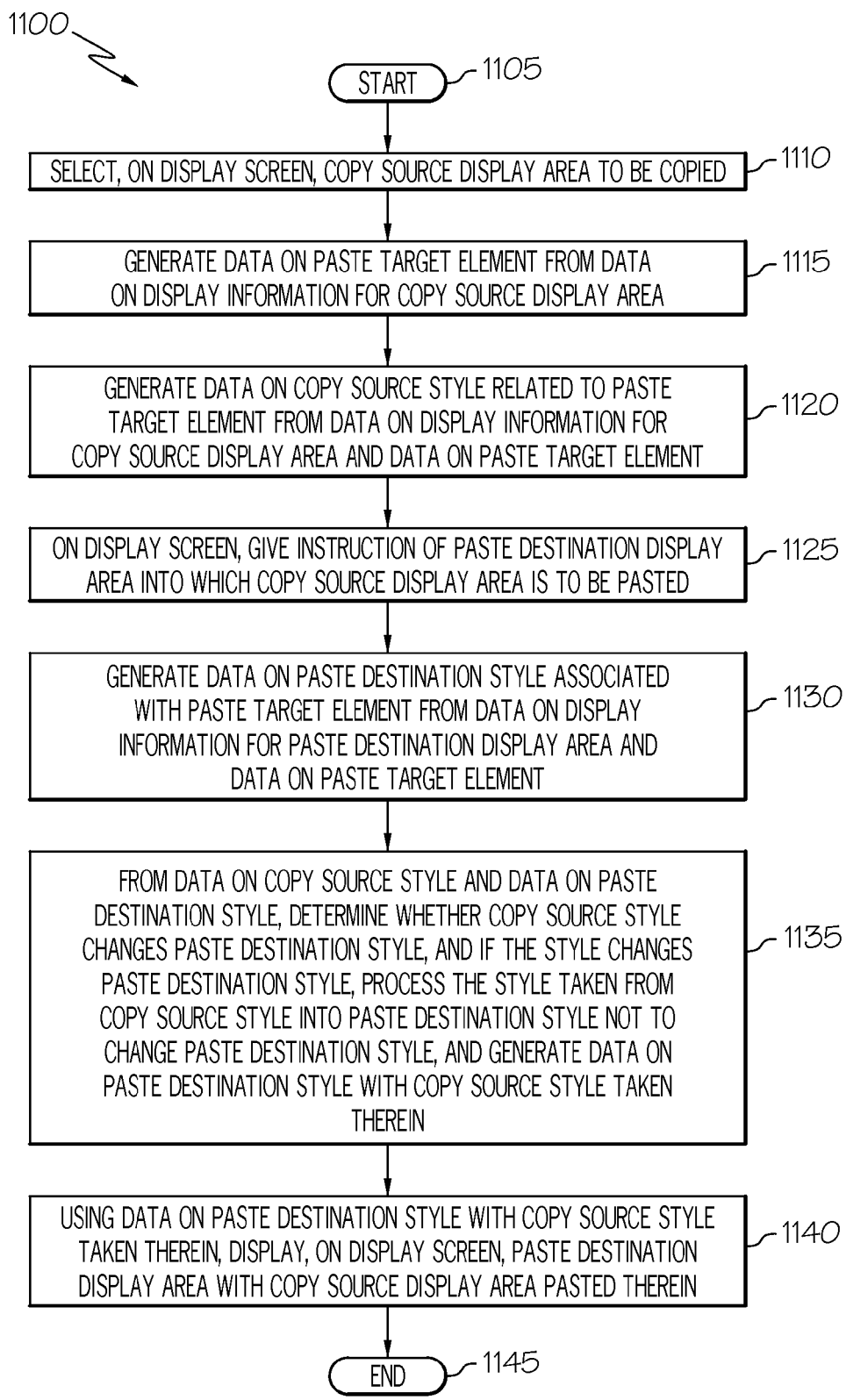
FIG. 11 is a flowchart of a copy and paste method according to one preferred embodiment of the present invention.

FIG. 11 shows a processing flow 1100 of a copy and paste method according to one embodiment of the present invention. The processing starts at step 1105. In step 1110, a copy source display area to be copied is selected on the display screen. Particularly, the copy source display area to be copied is selected using an input device on a display screen displayed in the display unit using elements the display of which is specified by style. In step 1115, data on a paste target element is generated by the processing unit from the data on display information for the copy source display area held in the storage unit. In step 1120, data on a copy source style related to the paste target element is generated by the processing unit from the data on display information for the copy source display area and the data on the paste target element. In step 1125, instruction of a paste destination display area, into which the copy source display area is to be pasted, is given on the display screen of the display unit using the input device. In step 1130, data on a paste destination style associated with the paste target element is generated by the processing unit from the data on display information for the paste destination display area held in the storage unit and the data on the paste target element. In step 1135, from the data on the copy source style and the data on the paste destination style, it is determined by the processing unit whether the copy source style is a style that changes the paste destination style. If the style changes the paste destination style, the style taken from the copy source style into the paste destination style is processed not to change the paste destination style, and data on the paste destination style with the copy source style taken therein is generated. In step 1140, using the data on the paste destination style with the copy source style taken therein, a paste destination display area with the copy source display area pasted therein is displayed by the processing unit on the display screen of the display unit. The processing ends at step 1145.

Figure 12:
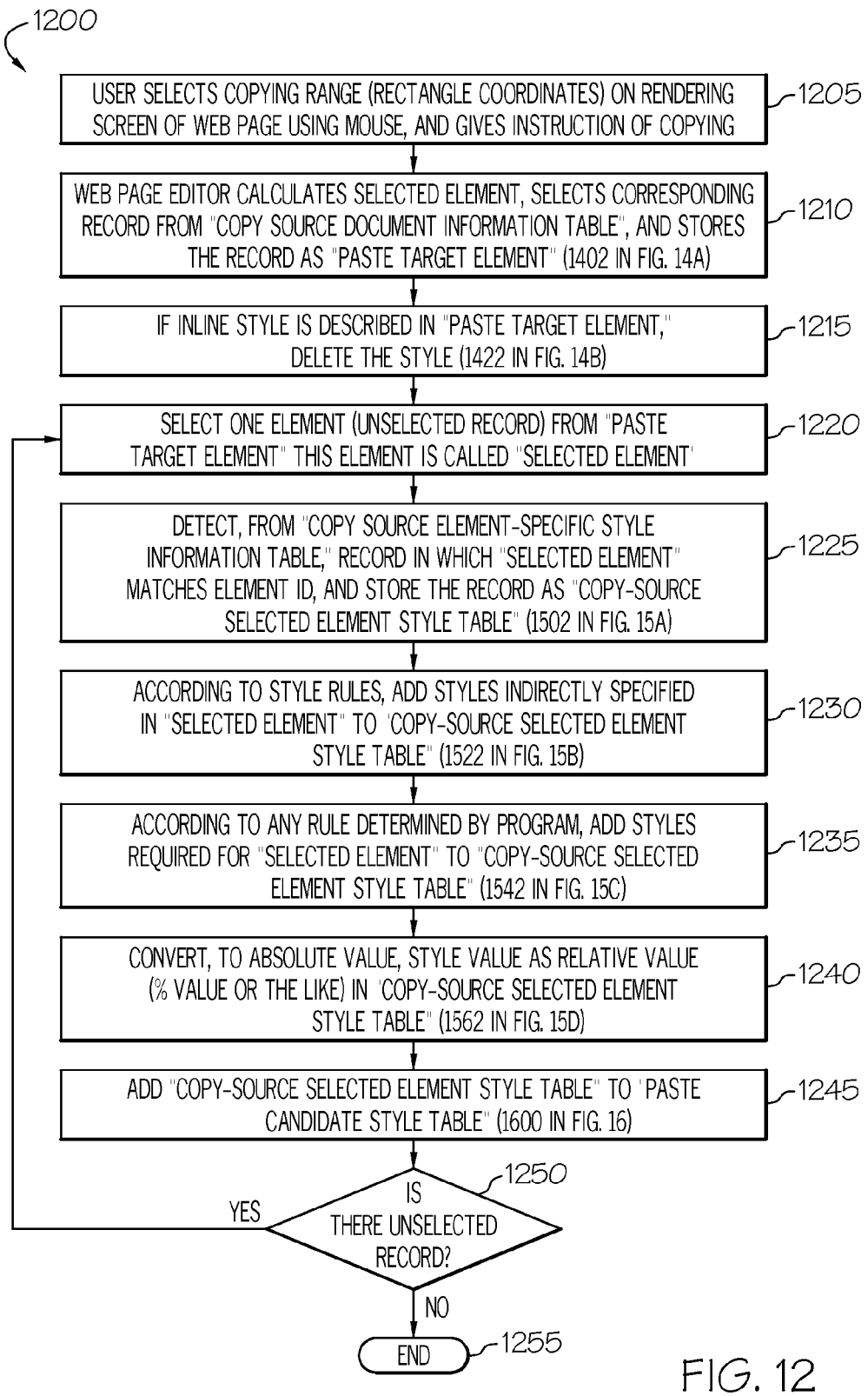
FIG. 12 is a flowchart showing one example of paste target extraction processing in the embodiment of FIG. 11.

FIG. 12 shows one example of paste target extraction processing of the copy and paste method according to an embodiment of the present invention. A processing flow 1200 shown in FIG. 12 includes processing steps of determining and storing a group of paste target elements and the style of each element. The processing steps will be described with regard to the example of rendering a web page shown in FIG. 6, FIG. 7 and FIG. 28. The processing starts when a user selects a copying range (rectangle coordinates) on the rendering screen of the web page using the mouse and gives instruction of copying (step 1205). As previously described in FIG. 10, a document information table 1002, a style information table 1022, and an element-specific style table 1042 are generated for copy sources by the processing unit of the computer and pre-stored in a storage unit.

Figures 13A, 13B:
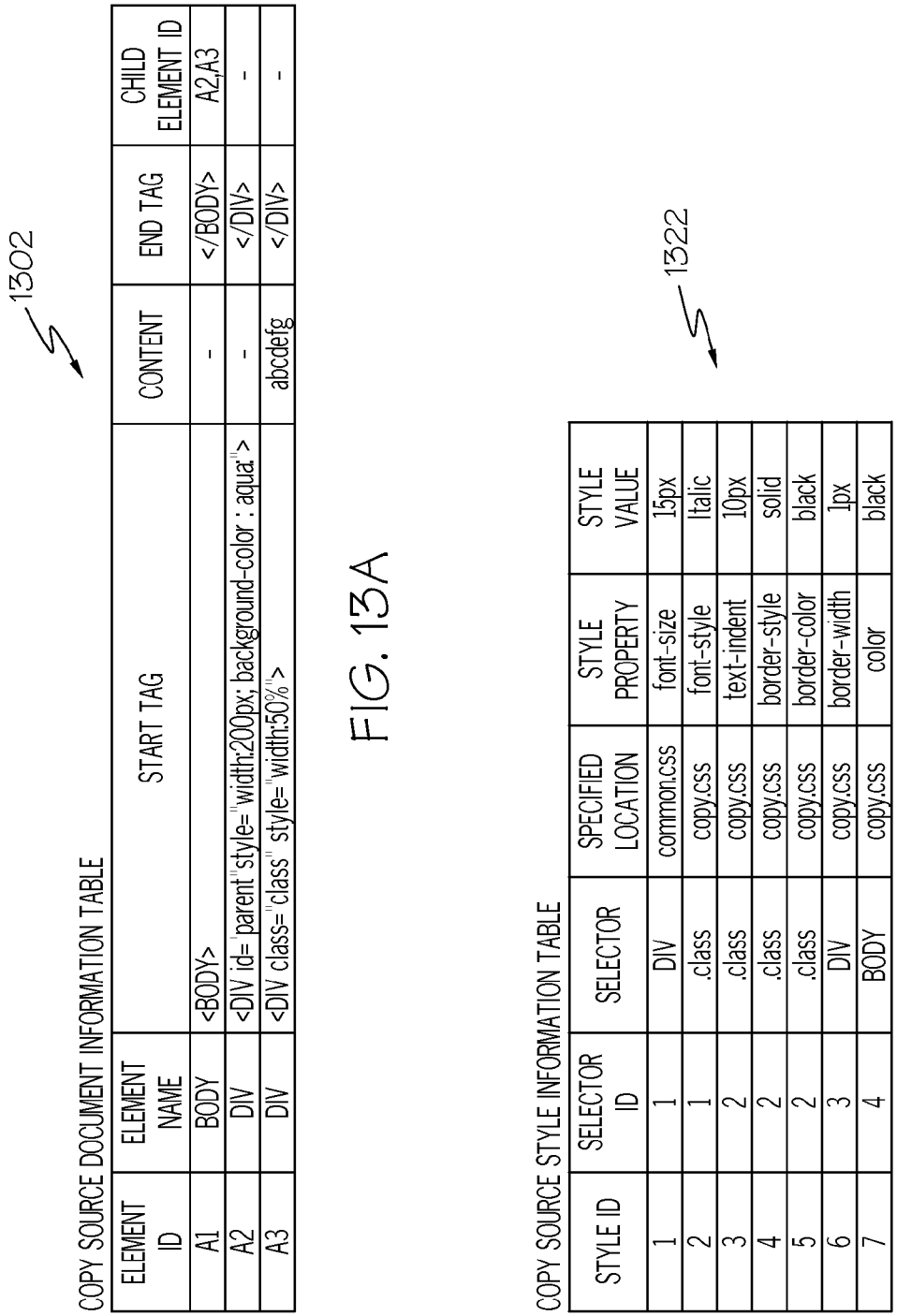
FIGS. 13A-C are a diagram showing tables generated and used in the example of FIG. 12.
Figure 13C:
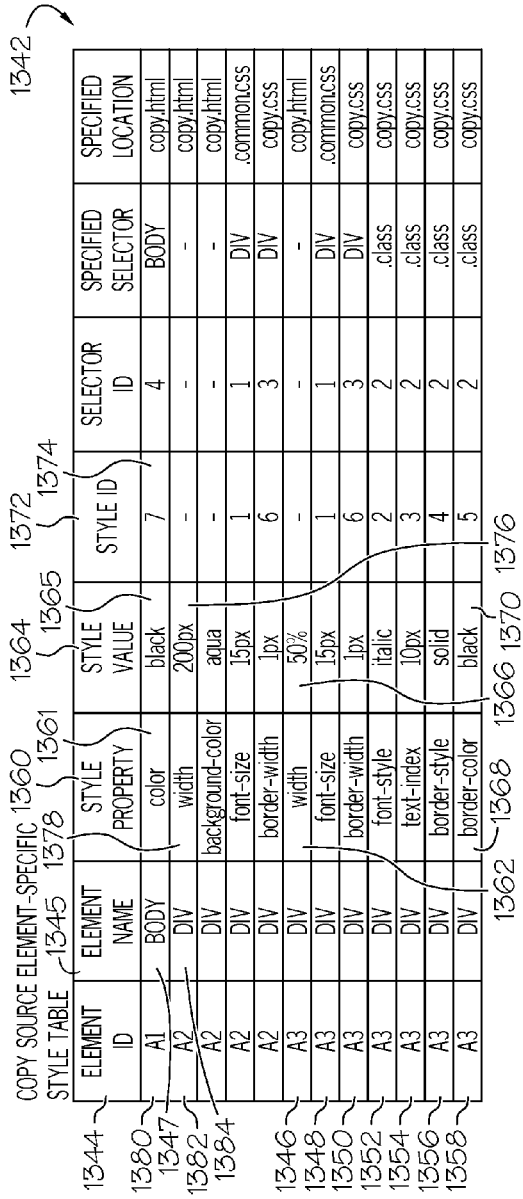

FIGS. 13A-C show a copy source document information table 1302, a copy source style information table 1322 and a copy source element-specific style table 1342. Entries of information included in the respective tables can be understood from the HTML file 702 document shown in FIG. 7 and the CSS file 2800 of the copy source of FIG. 28, and especially in FIG. 28.

Figure 14A:
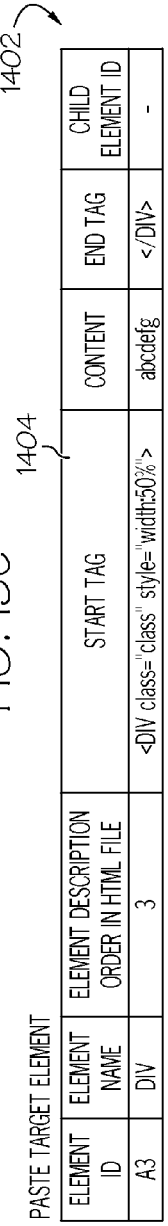
FIGS. 14A-B are a diagram showing tables generated and used in the example of FIG. 12.

Referring again to FIG. 12, in step 1210, the web page editor calculates a selected element (see the processing for responding to an instruction from the rendering screen shown in FIGS. 9A-B), selects a corresponding record from the "copy source document information table" (see 1302 in FIG. 13A), and stores the record as the "paste target element" (see 1402 in FIG. 14A).

Figure 14B:
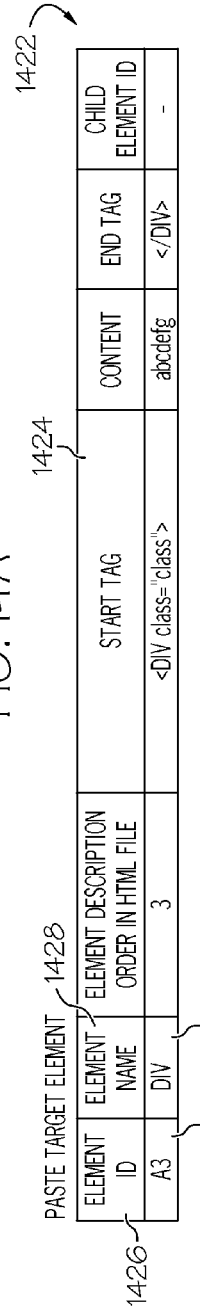

In step 1215, if an inline style (see specifying in an element concerned (style attribute or the like) 410, in FIG. 4) is described in the "paste target element" 1422, the style is deleted (see 1422 in FIG. 14B). In paste target element 1422 of FIG. 14B, information in the entry of the start tag 1424 is <DIVclass="class">, which is obtained by deleting style="width:50%" from information<DIVclass="class" style="width:50%"> in the entry of the start tag 1404 for paste target element 1402 in FIG. 14A.

In step 1220, one element (unselected record) is selected from the "paste target element." This element is called "selected element." Here, an element whose element ID 1426 is A3 and element name 1428 is DIV 1429 in paste target element 1422 of FIG. 14B is the "selected element."

In step 1225, a record in which the "selected element" matches the element ID is detected from the "copy source element-specific style table" 1342 (FIG. 13C), and recorded as the "copy-source selected element style table" 1502 (FIG. 15A). Here, since the element whose element ID 1426 is A3 and element name 1428 is DIV 1429 is the "selected element" shown in paste target element 1422 of FIG. 14B, a group of elements whose element ID 1344 is A3, i.e., seven elements (1346, 1348, 1350, 1352, 1354, 1356, and 1358) having style property 1360 from "width" 1362 and style value 1364 "50%" 1366 to the element 1358 having style property 1360 of "border-color" 1368 and style value 1364 of "black" 1370 from copy source element-specific style table 1342 of FIG. 13C are recorded.

In step 1230, styles indirectly specified in the "selected element" are added to the "copy-source selected element style table" 1522 according to the style rules (see FIG. 15B). The style rules, especially CSS rules, are preprogrammed based on the CSS specifications (W3C recommendation) defined by the W3C that has developed the standardization of HTML. To add styles in this case means to create new records in a copy-source selected element style table and sets style information "style Property" and "style value," as specified. The specified selector and the style ID are left unset. Here, the element whose element ID 1426 is A3 1427 and element name 1428 is DIV 1429 is the "selected element" shown in paste target element 1422 of FIG. 14B. Since a style indirectly specified in this "selected element" is the first element having element ID 1344 of "A1" 1380, element name 1345 of "BODY" 1347, style property 1360 of "color" 1361, and style value 1364 of "black" 1365 in copy source element-specific style table 1342 of FIG. 13C, the style property "color" 1361 and the style value "black" 1365 of this element are added together with the style ID 1372 of "7" 1374 to the last line of the copy-source selected element style table 1522 (see FIG. 15B).

In step 1235, styles required for the "selected element" are added to the "copy-source selected element style table" according to any rule determined by the program (see 1542 in FIG. 15C). This rule can be set in the program at the user's discretion. For example, if the style of the background color (style property "background-color") is transparent but the background color of the parent element is "blue" in the parent element style, the same background color as that of the parent element will be added to the element. In the last line of copy-source selected element style table 1542 of FIG. 15C, a style with style value "aqua" is added to the style property "background-color."

In step 1240, when any style value is a relative value (e.g., "%" value) in the "copy-source selected element style table" 1562, the style value is converted to an absolute value (see FIG. 15D). The conversion to this absolute value can be set in the program at the user's discretion. For example, when the unit of the style value for the style property is "%," since it means the ratio of the style value to a style value for the same style property of the parent element according to the CSS rules, the program converts it to the absolute value using "style value and "%" of the same style property of the parent element. Here, the style value "selected element." corresponds to the first selected element whose style property is "width" 1544 and style value "50%" 1546 in the copy-source selected element style table 1542. The style value for the same style property of the parent element is that of the second element in copy source element-specific style table 1342 of FIG. 13C, i.e., "200px" 1376 from the style value 1364 for the style property 1360 of "width" 1378 of the element whose element ID 1344 of "A2" 1382 and element name 1345 of "DIV" 1384. Using this style value 1364 of "200px" 1376 and "50%" mentioned above, the style value is converted to an absolute value of "100px." In copy-source selected element style table 1562 of FIG. 15D, the style value 1566 for the first selected element is the converted absolute value "100px" 1566.

In step 1245, the "copy-source selected element style table" 1562 in FIG. 15D is added to the "paste candidate style table" 1600 (see FIG. 16). In this step, as shown in FIG. 16, new records are created in the paste candidate style table 1600, and the entries of "style property" 1602, "style value" 1604, "specified selector" 1606, and "specified location" 1608, as style information, are set as specified together with the element ID 1610 and the element name 1612 of each "selected element."

In step 1250, it is determined whether there are any unselected records, and if there are (Yes), the procedure returns to step 1220, while if not (No), the procedure proceeds to step 1255 to end the sequence of processing steps.

Figure 17A:
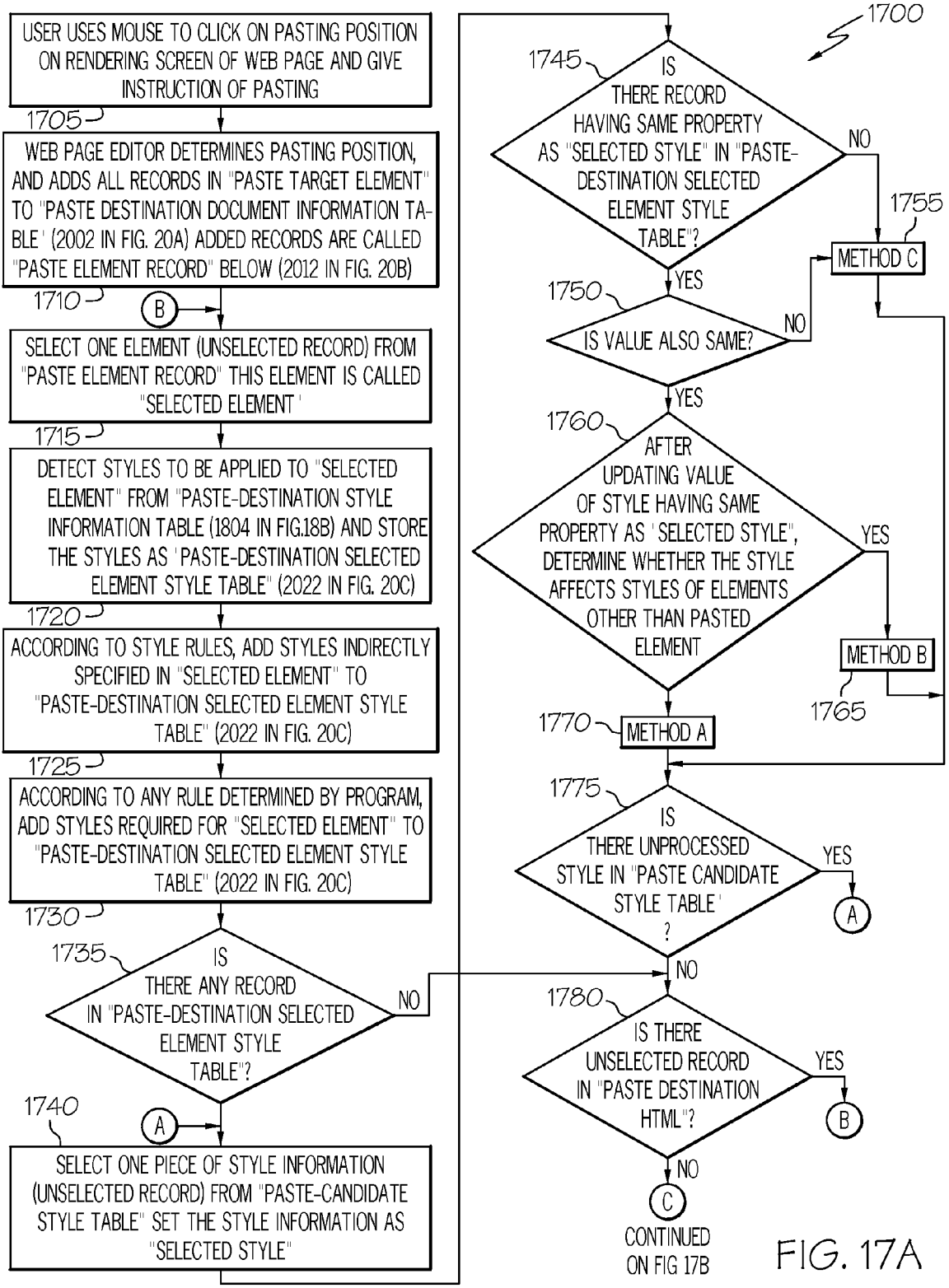

FIGS. 17A-B show one example of paste processing of the copy and paste method according to the present invention. A processing flow 1700 shown in FIG. 17A includes a processing step for pasting the recorded element group and styles. This processing step will be described with regard to the example of rendering a web page shown in FIGS. 6A-D, FIG. 7 and FIGS. 28A-B. The user uses the mouse to click on a pasting position on the rendering screen of the web page and gives instruction of pasting (step 1705). As mentioned above, document information table 1002, style information table 1022, and element-specific style table 1042, described with reference to FIG. 10C, are generated by the processing unit of the computer and pre-stored in a storage unit.

FIGS. 18A-C show paste destination document information table 1802, paste destination style information table 1804, and paste destination element-specific style table 1806. Entries of information included in the respective tables can be understood from the HTML file and the CSS file of the paste destination 604 shown in FIG. 6C and paste destination 2840 shown in FIG. 28B.

In step 1710, the web page editor determines a pasting position (see the processing for responding to an instruction from the rendering screen shown in FIGS. 9A-B), and adds all the records in the "paste target element" 1902 (see FIG. 19A) to the "paste destination document information table" 1802 (see FIG. 18A), and "paste destination document information table" 2002 (see FIG. 20A). The added records are called "paste element record" 2012 (see FIG. 20B). In this example, paste target element 1902 of FIG. 19A corresponds to paste target element 1422 of FIG. 14B, and this paste target element is added to paste destination document information table 1802 of FIG. 18A, ending up like paste destination document information table 2002 of FIG. 20A.

In step 1715, one element (unselected record) is selected from the "paste element record." This element is called "selected element." Here, an element whose element ID 2014 is "A3" 2016 and element name 2018 is "DIV" 2020 in paste element record 2012 of FIG. 20B is the "selected element."

In step 1720, styles to be applied to the "selected element" are detected from the "paste destination style information table" 1804 (see FIG. 18B), and stored as a "paste-destination selected element style table" 2022 (see FIG. 20C). Here, the element whose element ID 2014 is A3 2016 and element name 2018 is DIV 2020 is the "selected element" shown in paste element record 2012 of FIG. 20B is the "selected element," and the styles to be applied to this "selected element" by the style rules are styles from the first style having style ID 1808 of "1" 1810, selector ID 1812 of "1" 1814 and selector 1816 of "DIV" 1818 to the fifth style having style ID 1808 of "5" 1820, selector ID 1812 of "4" 1822 and selector 1816 of "DIV" 1824, i.e., five styles, in paste destination style information table 1804 of FIG. 18B. These five styles are recorded in paste-destination selected element style table 2022 of FIG. 20C. Note that since the second and third styles with selector 1816 of "*" in paste destination style information table 1804 of FIG. 18B are applied to all elements, these styles are also recorded in the paste-destination selected element style table 2022 of FIG. 20C.

In step 1725, styles indirectly specified in the "selected element" are added to the "paste-destination selected element style table" 2022 of FIG. 20C, according to the style rules. As already mentioned above, the style rules, especially the CSS rules, are preprogrammed based on the CSS specifications (W3C recommendation) defined by the W3C that has developed the standardization of HTML. Since there is no style indirectly specified in the "selected element" with element ID 2014 of "A3" 2016, and element name 2018 of "DIV" 2020 shown in paste element record 2012 of FIG. 20B, no style is added to paste-destination selected element style table 2022 of FIG. 20C.

In step 1730, styles required for the "selected element" are added to the "paste-destination selected element style table" 2022 of FIG. 20C, according to any rule determined by the program. Likewise, since there is no style following any rule determined by the program and required for the "selected element" with element ID 2014 of "A3" 2016 and element name 2018 of "DIV" 2020 shown in paste element record 2012 of FIG. 20B, no style is added to paste-destination selected element style table 2022 of FIG. 20C.

In step 1735, it is determined whether there is any record in the "paste-destination selected element style table" 2022 (see FIG. 20C). If there is any record (Yes), the procedure proceeds to step 1740, while if there is no record (No), the procedure jumps to step 1780.

In step 1740, one piece of style information (unselected record) is selected from the "paste candidate style table" 1912 (see FIG. 19B). The style information is set as "selected style."

In step 1745, it is determined whether there is a record having the same property as the "selected style" in the "paste-destination selected element style table" 2022 (see in FIG. 20C), and if there is a record (Yes), the procedure proceeds to step 1750, while if not (No), the procedure proceeds to "method c" in step 1755. The "method c" in step 1755 will be discussed later.

In step 1750, it is determined whether the value of the style is also the same, and if the same (Yes), the procedure proceeds to step 1760, while if not the same (No), the procedure proceeds to step 1775.

In step 1760, it is determined whether the value of the style having the same property as the "selected style" is updated, the style affects the styles of elements other than the pasted element, and if affecting (Yes), the procedure proceeds to "method b" in step 1765, while if not (No), the procedure proceeds to "method a" in step 1770. For example, when the specified selector of the "selected style" is "DIV," it is checked whether there is any other DIV element referencing the style in the HTML file. If there is such a DIV element, it means that the style affects the styles of elements other than the pasted element. The "method b" in step 1765 and the "method a" in step 1770 will be discussed later.

In step 1775, it is determined whether there is any unprocessed style in the "paste candidate style table" 1912 (see FIG. 19B), and if there is any unprocessed style (Yes), the procedure returns to step 1740, while if not (No), the procedure proceeds to step 1780.

In step 1780, it is determined whether there is any unselected record in a "paste destination HTML" file, and if there is any unselected record (Yes), the procedure returns to step 1715, while if not (No), the procedure proceeds to step 1785.

In step 1785, the content of the paste destination HTML file is updated based on an updated "paste destination document information table" 2102 (see FIG. 21A).

In step 1790, the content of the CSS file is updated based on an updated "paste destination style information table" 2112 (see FIG. 21B). Then, the procedure proceeds to step 1795 to end the sequence of processing steps.

FIG. 22 shows a processing flow 2200 of the "method a" (see step 1770 in FIG. 17), where the value of an existing style at the paste destination is changed. In step 2205, a record having the same property as the "selected style" is selected from the "paste-destination selected element style table" 2022 (see FIG. 20C). As an example, when the property of the selected style is the style "border-width" 2304, as shown at 2302 of FIG. 23A, since the fourth record in the "paste-destination selected element style table" 2022 (see FIG. 20C) has the same property, the record is selected (see 2312 in FIG. 23B).

In step 2210, the value of the selected style is changed to a style value in the "paste candidate style table" 1912 (see FIG. 19B). In this example, although the style value for the selected fourth record is "0px" as shown in 2312 of FIG. 23B, since the style value of "border-width" in the third property in paste candidate style table 1912 of FIG. 19B is "1px," the style value is changed to "1px" (see 2322 in FIG. 23C).

In step 2215, the "paste destination style information table" 2112 (see FIG. 21B) is updated based on the change in the "paste-destination selected element style table" 2022 (see FIG. 20C). Further, the style value of a record(s) having the same style ID is updated.

FIG. 24 shows processing for describing a style by the specification method of "method b" (see step 1765 in FIG. 17) that affects only the pasted element. There are two ways of implementing the "method b," and use of either way is optional. In step 2405 shown in FIG. 24, a style in the "paste candidate style table" 1912 (see FIG. 19B) is directly specified and written into the element. In other words, the style is written in the start tag of the selected element in the "paste destination document information table" 2002 (see FIG. 20A). As an example, when the selected style is a style having property "text-indent" 2504 and style value "10px" 2506, as shown in 2502 of FIG. 25A, style "style="text-indent: 10px;"" 2514 is written in the start tag 2516 of the third element in the "paste destination document information table" 2512 (see 2002 in FIG. 20A) (see 2512 in FIG. 25B).

In step 2410, shown as an alternative to step 2405, a selector name specifying only the element is created. The "document information table" 2522 is updated as needed. For "selected element." example, ID or class is newly added as the selector name. Shown in paste destination document information table 2522 of FIG. 25C is an example where "A001" is created as the ID of the third element (see start tag 2524 "id="A001"").

In step 2415, according to priority rules, a selector having the "created selector name" is created in a position where the target style is selected as a style, and the "paste candidate style table" is updated to write the style in the selector. As already mentioned above, the level of importance varies depending on the position in which the style is written. As shown in 2542 of FIG. 25D, there is the style with the same selector "DIV" or "*" and the same style property "text-indent" 2546. In the case of a rule that the style described posterior becomes effective, a new style is added to style "style.css" described posterior to style "paste.css." As shown in 2544 of FIG. 25E, the corresponding fifth style record in the paste candidate style table is updated in such a manner that the selector is rewritten to "#A001" and the specified location is rewritten to "style.css," and added to the paste destination style information table.

FIG. 26 shows processing of "method c" (see step 1755 in FIG. 17A) for adding the same selector as the copy source to describe the same style therein. In step 2605, the same selector as that in the "paste candidate style table" is written in any location, and the same style is written therein. As an example, a case where the selected style has property "border-style" in 2702 of FIG. 27A is shown. As shown in 2712 of FIG. 27B, the same styles "border-style" and "solid" are written in the same selector ".class."

Figures 28A, 28B:
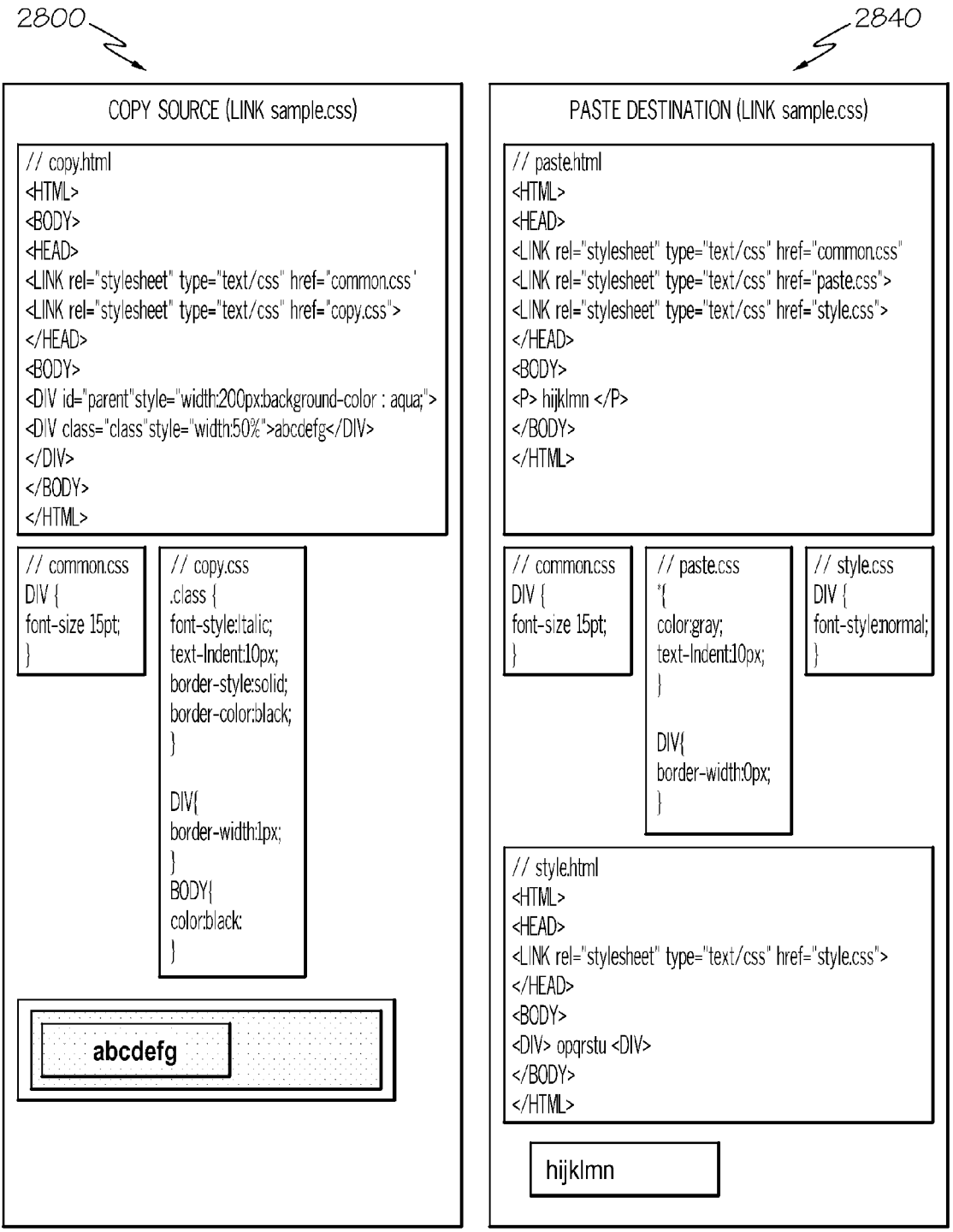
FIGS. 28A-B are a diagram showing an example of web page rendering.
Figure 29:
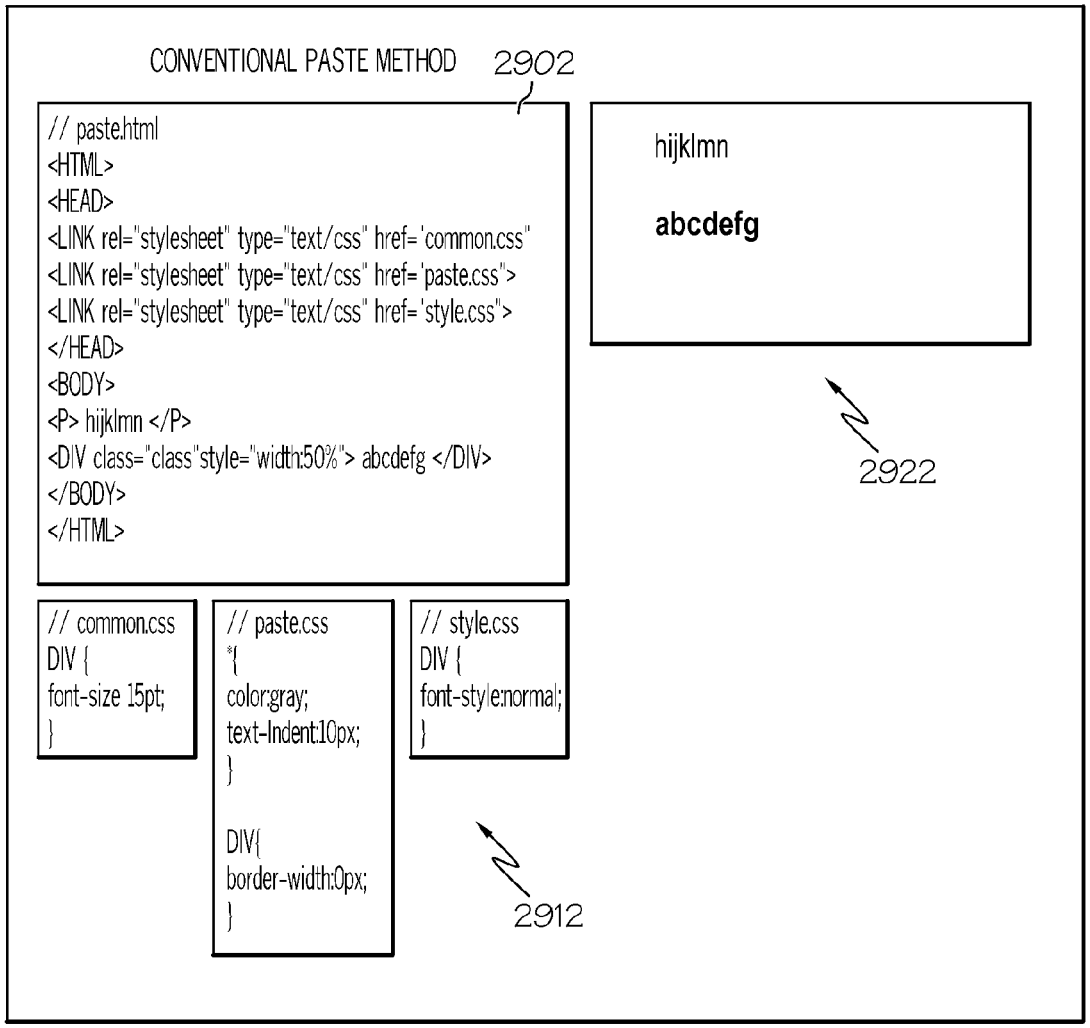
FIG. 29 is a diagram showing the result of copy and paste by a conventional technique.
Figure 30:
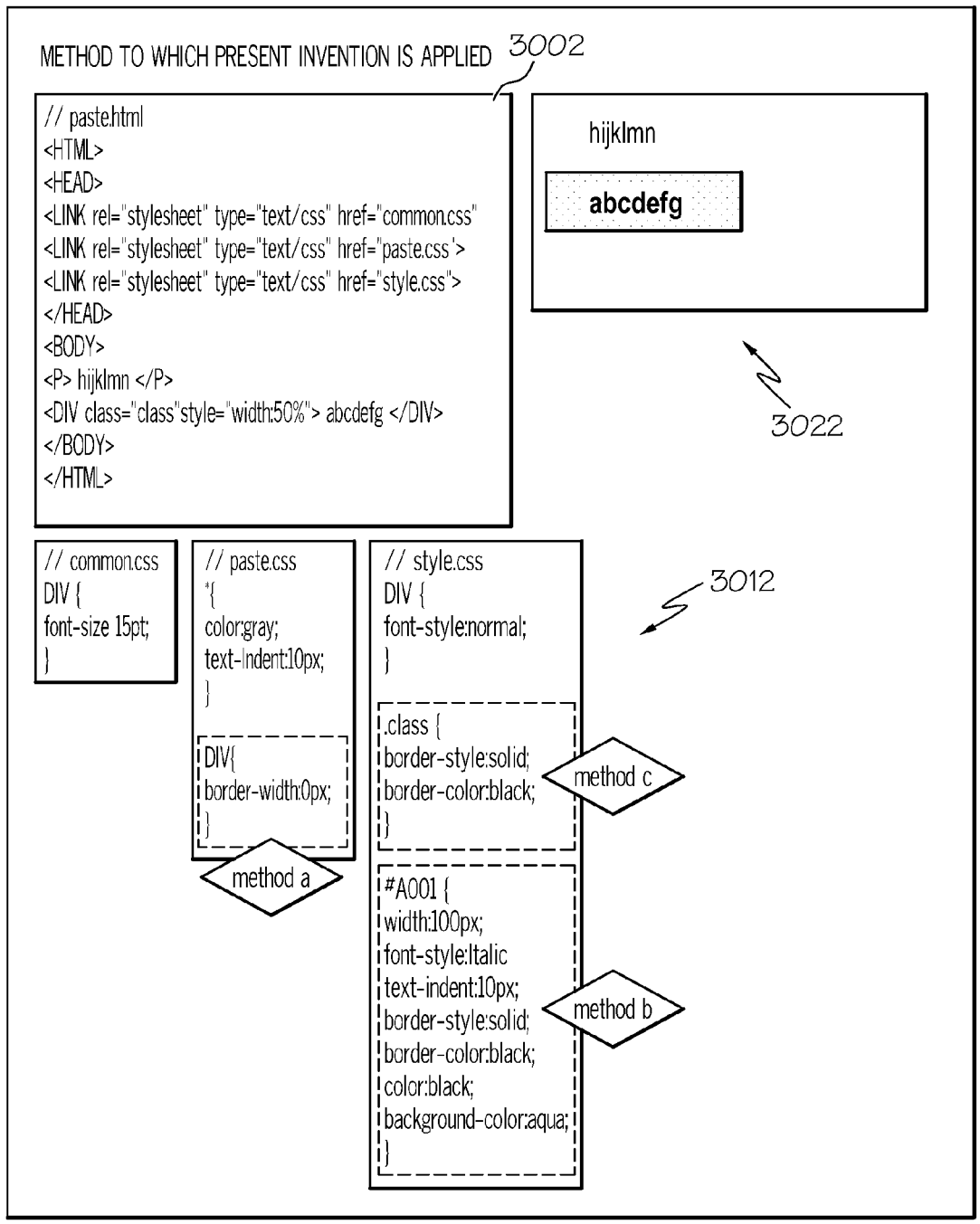
FIG. 30 is a diagram showing the result of copy and paste to which the present invention is applied.

FIGS. 28A-B show an example of rendering a web page. In FIG. 28A, copy source 2800 and paste destination 2840 HTML files and CSS files are shown together with the rendering screen displays. FIG. 29 shows an HTML file 2902 and a CSS file 2912 resulting from pasting by a conventional copy and paste method together with the rendering screen display 2922. In the conventional copy and paste method, the pasted one becomes different in display style from the copied one. FIG. 30 shows the HTML file 3002 and the CSS file 3012 resulting from pasting to which the present invention is applied together with the rendering screen display 3022. In the case of pasting to which the present invention is applied, the pasted one is the same in display style as the copied one. Each of portions of the CSS file indicated as "method a," "method b" and "method c" is a portion processed by each of these methods.

The above describes the processing of the copy and paste method according to an embodiment contemplated by the present invention, where the CPU 101 (processing unit) (FIG.

1) performs the processing. When a computer program, according to one embodiment contemplated by the present invention to implement the method on a computer is installed on the computer, the CPU 101 (processing unit) implements a software module configuration cited below. This software module configuration can also be implemented by a hardware configuration by implementing the modules using microcode.

Figure 31:
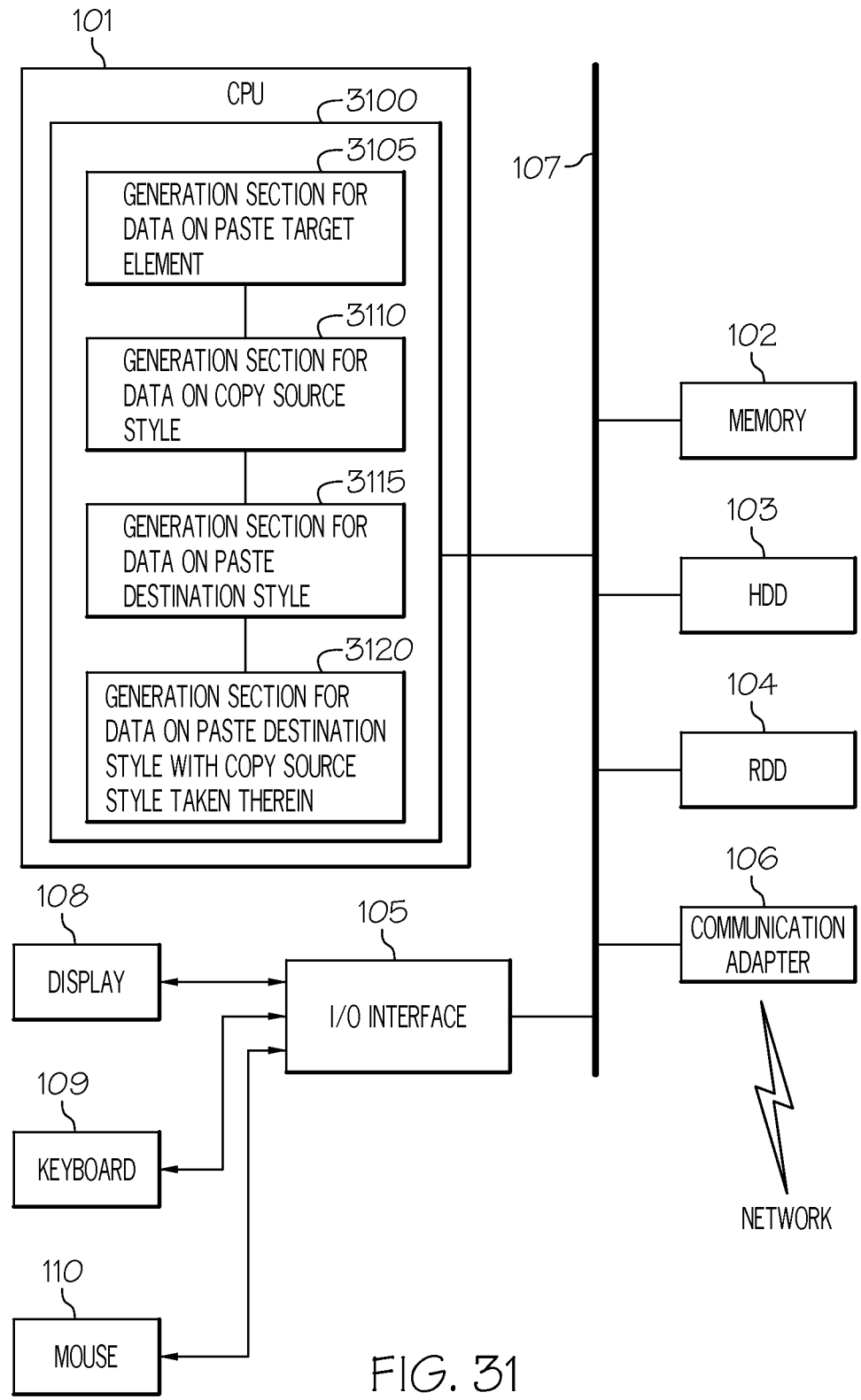
FIG. 31 is a schematic block diagram showing a configuration of a copy and paste system according to one preferred embodiment of the present invention.

FIG. 31 shows a configuration 3100 implemented by the CPU 101 (processing unit). A copy source display area to be copied is selected on the display 108 using the keyboard 109 or the mouse 110 (input device) as input to the CPU 101 via the I/O interface 105 and the bus 107. In the CPU 101, a generation section 3105 for data on paste target element acquires data on display information for the copy source display area from the HDD 103 (storage unit) via the bus 107 to generate data on a paste target element. From the acquired data on display information for the copy source display area and the data on the paste target element generated by the generation section 3105 for data on paste target element, a generation section 3110 for data on copy source style generates data on a copy source style related to the paste target element.

The fact that instruction of a paste destination display area, into which the copy source display area is to be pasted, is given on the display screen of the display 108 using the keyboard 109 or the mouse 110 is also input to the CPU 101 via the I/O interface 105 and the bus 107. In the CPU 101, a generation section 3115 for data on paste destination style acquires data on display information for the paste destination display area from the HDD 103 via the bus 107 to generate data on the paste destination style associated with the paste target element from the acquired data on display information for the paste destination display area and the data on the paste target element generated by the generation section 3105 for data on paste target element. Further, from the data on the copy source style generated by the generation section 3110 for data on copy source style and the data on the paste destination style generated by the generation section 3115 for data on paste destination style, a generation section 3120 for data on paste destination style with copy source style taken therein determines whether the copy source style is a style that changes the paste destination style. If the style is a style that changes the paste destination style, the style taken from the copy source style into the paste destination style is processed not to change the paste destination style, and data on the paste destination style with the copy source style taken therein is generated. Then, the CPU 101 uses the data on the paste destination style with the copy source style taken therein, which is generated by the generation section 3120 for data on paste destination style with copy source style taken therein, to display, on the display 108, the paste destination display area with the copy source display area pasted therein.

The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A copy and paste method comprising:
   receiving a selection of a copy source display area to be copied from a display screen of a display unit, wherein said copy source display area comprises elements which are specified by style;
   generating, using a processing unit, data on a paste target element specified by style from stored data in a storage unit on display information for said copy source display area, wherein generating said data on said paste target element further comprises detecting data on display information for an element from said data on display information for said copy source display area and storing said data in said storage unit, and deleting a style from said data on display information for said element when said style is directly specified in said element while maintaining said style in said element upon display in a paste destination display area;
   generating, using said processing unit, data on a copy source style related to said paste target element from said data on display information for said copy source display area and said data on said paste target element, wherein a paste candidate style table is created for said data on each paste target element of said copy source display area comprising entries of at least style property, style value, specified selector, and specified location for said each paste target element of said copy source display area and is stored in said storage unit, and wherein generating said data on said copy source style related to said paste target element further includes converting any style value into an absolute value, when said any style value is set as a relative value in said paste candidate style table;
   indicating, using said input device on said display screen of said display unit, a paste destination display area into which said copy source display area is to be pasted;
   generating, using said processing unit, data on a paste destination style associated with said paste target element from data on display information for said paste destination display area stored in said storage unit and said data on said paste target element;
   determining, with said processing unit, from said generated data on said copy source style and said data on said paste destination style, whether said paste destination style would change said copy source style;
   when it is determined that said paste destination style would change said copy source style, processing said copy source style into said paste destination style in order to make said paste destination style consistent with said copy source style, and generating data on said paste destination style with said copy source style therein; and
   displaying said paste destination display area, with said copy source display area pasted therein, on said display screen using said data generated on said paste destination style with said copy source style therein.

2. The method of claim 1, wherein generating said data on said copy source style related to said paste target element further comprises detecting data on a style with said paste target element matching an element ID from said data on display information for said copy source display area, and storing said detected data in said storage unit.

3. The method of claim 2, wherein generating said data on said copy source style related to said paste target element includes detecting, according to a style rule, data on a style indirectly specified in said paste target element from said data on display information for said copy source display area, and storing said detected data in said storage unit.

4. The method of claim 3, wherein generating said data on said copy source style related to said paste target element includes detecting, according to an arbitrarily set rule, data on a style required for said paste target element from said data on display information for said copy source display area, and storing said detected data in said storage unit.

5. The method of claim 1, wherein generating said data on said paste destination style associated with said paste target element includes detecting data on a style applied to said paste target element from said data on display information for said paste destination display area, and storing said detected data in said storage unit.

6. The method of claim 5, wherein generating said data on said paste destination style associated with said paste target element includes detecting, according to a style rule, data on a style indirectly specified in said paste target element from said data on display information for said paste destination display area, and storing said detected data in said storage unit.

7. The method of claim 6, wherein generating said data on said paste destination style associated with said paste target element includes detecting, according to an arbitrarily set rule, data on a style required for said paste target element from said data on display information for said paste destination display area, and storing said detected data in said storage unit.

8. The method of claim 1, wherein determining whether said copy source style is a style that changes said paste destination style includes determining whether there is a paste destination style having a property identical to that of said copy source style.

9. The method of claim 8, wherein when there is a paste destination style having said property identical to that of said copy source style, it is determined whether style values are identical to each other.

10. The method of claim 9, wherein when said style values are identical to each other, it is determined whether, if said style value of said paste destination style is changed to said style value of said copy source style, a style of any element other than said paste target element in said paste destination display area is changed.

11. The method of claim 10, wherein when said style of any element other than said paste target element in said paste destination display area is changed, processing performed not to change said paste destination style includes changing said copy source style into a style directly specified in said paste target element.

12. The method of claim 10, wherein when said style of any element other than said paste target element in said paste destination display area is changed, processing performed not to change said paste destination style includes creating a selector specifying only said paste target element and changing said copy source style into a style specified by said selector.

13. The method of claim 10, wherein when said style of any element other than said paste target element in said paste destination display area is not changed, said style value of said paste destination style is changed to said style value of said copy source style.

14. A computer program product for copying and pasting, the computer program product comprising a non-transitory computer readable storage medium having computer readable program code embodied therewith, the computer readable program code comprising:

computer readable program code configured to select a copy source display area to be copied from a display screen of a display unit, wherein said copy source display area comprises elements which are specified by style;

computer readable program code configured to generate data on a paste target element specified by style from stored data in a storage unit on display information for said copy source display area, wherein generating said data on said paste target element further comprises detecting data on display information for an element from said data on display information for said copy source display area and storing said data in said storage unit, and deleting a style from said data on display information for said element when said style is directly specified in said element while maintaining said style in said element upon display in a paste destination display area;

computer readable program code configured to generate data on a copy source style related to said paste target element from said data on display information for said copy source display area and said data on said paste target element, wherein a paste candidate style table is created for said data on each paste target element of said copy source display area comprising entries of at least style property, style value, specified selector, and specified location for said each paste target element of said copy source display area and is stored in said storage unit, and wherein generating said data on said copy source style related to said paste target element further includes converting any style value into an absolute value, when said any style value is set as a relative value in said paste candidate style table;

computer readable program code configured to indicate, using said input device on said display screen of said display unit, a paste destination display area into which said copy source display area is to be pasted;

computer readable program code configured to generate data on a paste destination style associated with said paste target element from data on display information for said paste destination display area stored in said storage unit and said data on said paste target element;

computer readable program code configured to determine from said generated data on said copy source style and said data on said paste destination style, whether said paste destination style would change said copy source style;

computer readable program code configured to, when it is determined that said paste destination style would change said copy source style, process said copy source style into said paste destination style in order to make said paste destination style consistent with said copy source style, and generate data on said paste destination style with said copy source style therein; and computer readable program code configured to display said paste destination display area, with said copy source display area pasted therein, on said display screen using said data generated on said paste destination style with said copy source style therein.

15. A copy and paste system comprising a processor and memory connected to the processor, wherein the memory is encoded with instructions and wherein the instructions when executed comprise:

instructions for receiving a selection of a copy source display area to be copied from a display screen of a display unit, wherein said copy source display area comprises elements which are specified by style;

instructions for generating, data on a paste target element specified by style from stored data in a storage unit on display information for said copy source display area, wherein generating said data on said paste target element further comprises detecting data on display information for an element from said data on display information for said copy source display area and storing said data in said storage unit, and deleting a style from said data on display information for said element when said style is directly specified in said element while maintaining said style in said element upon display in a paste destination display area;

instructions for generating, data on a copy source style related to said paste target element from said data on display information for said copy source display area and said data on said paste target element, wherein a paste candidate style table is created for said data on each paste target element of said copy source display area comprising entries of at least style property, style value, specified selector, and specified location for said each paste target element of said copy source display area and is stored in said storage unit, and wherein generating said data on said copy source style related to said paste target element further includes converting any style value into an absolute value, when said any style value is set as a relative value in said paste candidate style table;

instructions for indicating, on said display screen of said display unit, a paste destination display area into which said copy source display area is to be pasted;

instructions for generating, data on a paste destination style associated with said paste target element from data on display information for said paste destination display area stored in said storage unit and said data on said paste target element;

instructions for determining, from said generated data on said copy source style and said data on said paste destination style, whether said paste destination style would change said copy source style;

instructions, for when it is determined that said paste destination style would change said copy source style, processing said copy source style into said paste destination style in order to make said paste destination style consistent with said copy source style, and generating data on said paste destination style with said copy source style therein; and instructions for displaying said paste destination display area, with said copy source display area pasted therein, on said display screen using said data generated on said paste destination style with said copy source style therein.

* * * * *